(12) United States Patent
Irie et al.

(10) Patent No.: US 12,216,830 B2
(45) Date of Patent: Feb. 4, 2025

(54) INFORMATION PROCESSING APPARATUS AND INFORMATION PROCESSING METHOD

(71) Applicant: SONY GROUP CORPORATION, Tokyo (JP)

(72) Inventors: Atsushi Irie, Tokyo (JP); Kenji Gotoh, Tokyo (JP); Tetsuo Ikeda, Tokyo (JP); Yohsuke Kaji, Tokyo (JP); Eisuke Fujinawa, Tokyo (JP); Seishi Tomonaga, Tokyo (JP); Tadayoshi Murakami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 30 days.

(21) Appl. No.: 17/767,534

(22) PCT Filed: Jul. 13, 2020

(86) PCT No.: PCT/JP2020/027204
§ 371 (c)(1),
(2) Date: Apr. 8, 2022

(87) PCT Pub. No.: WO2021/075103
PCT Pub. Date: Apr. 22, 2021

(65) Prior Publication Data
US 2024/0069641 A1    Feb. 29, 2024

(30) Foreign Application Priority Data
Oct. 17, 2019    (JP) ................. 2019-190028

(51) Int. Cl.
*G06F 3/01*    (2006.01)
*G06F 3/042*    (2006.01)
(Continued)

(52) U.S. Cl.
CPC ............ *G06F 3/017* (2013.01); *G06F 3/0425* (2013.01); *G06F 3/04883* (2013.01); *G06V 40/28* (2022.01)

(58) Field of Classification Search
None
See application file for complete search history.

(56) References Cited

U.S. PATENT DOCUMENTS

2008/0246740 A1    10/2008    Nakamura et al.
2013/0141373 A1*    6/2013    Takuma .............. G06F 3/04883
                                                                            345/173
(Continued)

FOREIGN PATENT DOCUMENTS

CN    109597485 A    4/2019
JP    2008-257454 A    10/2008
(Continued)

OTHER PUBLICATIONS

International Search Report and Written Opinion of PCT Application No. PCT/JP2020/027204, issued on Aug. 25, 2020, 09 pages of ISRWO.

*Primary Examiner* — Parul H Gupta
(74) *Attorney, Agent, or Firm* — CHIP LAW GROUP

(57) ABSTRACT

An information processing apparatus according to an embodiment of the present technology includes: a threshold value control unit. The threshold value control unit controls, on the basis of three-dimensional position information of each of a first finger and a second finger acquired from a detection result of a sensor, a threshold value relating to determination of a gesture using at least one of the first finger and the second finger. As a result, it is possible to perform gesture determination with high accuracy.

18 Claims, 14 Drawing Sheets

| State of little finger | State of ring finger | State of middle finger | Threshold value adjustment |
|---|---|---|---|
| Lower than ring finger and touching | | | Decrease threshold value of ring finger |
| | Lower than little finger and touching | | Decrease at least one of little finger or middle finger |
| | | Lower than ring finger and touching | Decrease threshold value of ring finger |
| Lower than ring finger and touching | | Lower than ring finger and touching | Decrease threshold value of ring finger or further decrease threshold value of ring finger |

(51) Int. Cl.
    *G06F 3/04883*     (2022.01)
    *G06V 40/20*     (2022.01)

(56) References Cited

U.S. PATENT DOCUMENTS

| | | | | |
|---|---|---|---|---|
| 2013/0167062 A1* | 6/2013 | Herring | ............... | G06F 3/04883 |
| | | | | 715/764 |
| 2014/0028557 A1 | 1/2014 | Otake et al. | | |
| 2014/0201690 A1* | 7/2014 | Holz | ................... | G06F 3/04817 |
| | | | | 715/863 |
| 2014/0298266 A1* | 10/2014 | Lapp | ................. | G06F 3/04886 |
| | | | | 715/835 |
| 2018/0024695 A1* | 1/2018 | Iyer | ........................ | B60K 35/00 |
| | | | | 345/175 |
| 2018/0088674 A1 | 3/2018 | Chen | | |

FOREIGN PATENT DOCUMENTS

| | | |
|---|---|---|
| WO | 2012/157272 A1 | 11/2012 |
| WO | 2019/039065 A1 | 2/2019 |

\* cited by examiner

| State of little finger | State of ring finger | State of middle finger | Threshold value adjustment |
|---|---|---|---|
| Lower than ring finger and touching | | | Decrease threshold value of ring finger |
| | Lower than little finger and touching | | Decrease at least one of little finger or middle finger |
| | | Lower than ring finger and touching | Decrease threshold value of ring finger |
| Lower than ring finger and touching | | Lower than ring finger and touching | Decrease threshold value of ring finger or further decrease threshold value of ring finger |

FIG.4

| State of little finger | State of ring finger | State of middle finger | Shape of hand | Threshold value adjustment |
|---|---|---|---|---|
| Lower than ring finger and touching | | | Paper | Decrease threshold value of ring finger |
| | Lower than little finger and touching | | Paper | Decrease at least one of little finger or middle finger |
| | | Lower than ring finger and touching | Paper | Decrease threshold value of ring finger |
| Lower than ring finger and touching | | Lower than ring finger and touching | Paper | Decrease threshold value of ring finger or further decrease threshold value of ring finger |

FIG.9

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/027204 filed on Jul. 13, 2020, which claims priority benefit of Japanese Patent Application No. JP 2019-190028 filed in the Japan Patent Office on Oct. 17, 2019. Each of the above-referenced applications is hereby incorporated herein by reference in its entirety.

TECHNICAL FIELD

The present technology relates to an information processing apparatus, an information processing method, and a program that are applicable to detection of a user operation and the like.

BACKGROUND ART

In the digital multifunction device described in Patent Literature 1, a projected capacitive touch panel detects the position a user's finger approaches. A touch intended by the user and a touch unintended by the user are determined on the basis of the time of change in capacitance when the touch panel is touched. As a result, it is intended to prevent an erroneous operation unintended by the user from occurring (paragraphs and [0047], FIG. 6, and the like of Patent Literature 1).

CITATION LIST

Patent Literature

Patent Literature 1: Japanese Patent Application Laid-open No. 2018-206749

DISCLOSURE OF INVENTION

Technical Problem

As described above, a technology making it possible to determine a user's gesture such as a touch operation with high accuracy is desired.

In view of the circumstances as described above, it is an object of the present technology to provide an information processing apparatus, an information processing method, and a program that are capable of performing gesture determination with high accuracy.

Solution to Problem

In order to achieve the above-mentioned object, an information processing apparatus according to an embodiment of the present technology includes: a threshold value control unit.

The threshold value control unit controls, on the basis of three-dimensional position information of each of a first finger and a second finger acquired from a detection result of a sensor, a threshold value relating to determination of a gesture using at least one of the first finger and the second finger.

In this information processing apparatus, on the basis of three-dimensional position information of each of a first finger and a second finger acquired from a detection result of a sensor, a threshold value relating to determination of a gesture using at least one of the first finger and the second finger is controlled. As a result, it is possible to perform gesture determination with high accuracy.

The gesture may include a touch operation on an object by at least one of the first finger or the second finger. In this case, the threshold value control unit may control a threshold value relating to a distance from the object for determining presence/absence of the touch operation.

The first finger and the second finger may be adjacent to each other. In this case, the threshold value control unit may decrease, where it is determined that there is the touch operation of the first finger on the object, the threshold value relating to a distance from the object for determining presence/absence of the touch operation of the second finger on the object.

The threshold value control unit may newly set, where it is determined that there is the touch operation of the first finger on the object, a threshold value relating to a difference between distances of the first finger and the second finger from the object as the threshold value for determining presence/absence of the touch operation of the second finger on the object.

The three-dimensional position information may include coordinates indicating a position of a finger, a distance between the finger and the object, and an amount of movement of the finger.

The gesture may include a slide operation using at least one of the first finger or the second finger. In this case, the threshold value control unit may control a threshold value relating the amount of movement of at least one of the first finger or the second finger for determining absence/presence of the slide operation.

The first finger and the second finger may be adjacent to each other. In this case, the threshold value control unit may decrease, where it is determined that there is the touch operation of the first finger on the object, the threshold value relating the amount of movement of the second finger for determining absence/presence of the slide operation of the second finger on the object.

The first finger and the second finger may be adjacent to each other. In this case, the threshold value control unit decreases, where the first finger that is in contact with the object is stationary, the threshold value relating the amount of movement of the second finger.

The first finger may be a middle finger or a little finger. In this case, the second finger may be a ring finger.

The sensor may include at least one of an imaging device or a ranging sensor.

The information processing apparatus may further include a touch determination unit that determines presence/absence of the touch operation of at least one of the first finger or the second finger on the object.

The first finger and the second finger may be adjacent to each other. In this case, the threshold value control unit may decrease, where it is determined that there is the touch operation of each of the first finger and the second finger on the object, the threshold value relating to a distance from the object for determining presence/absence of the touch operation of the second finger on the object.

The threshold value control unit may set the threshold value relating to the determination of a gesture for each finger.

The threshold value control unit may control the threshold value on the basis of a shape of a hand including the first finger and the second finger obtained by a detection result of the sensor.

The threshold value control unit may control the threshold value where the hand is in a predetermined shape.

The threshold value control unit may control the threshold value where the hand is open.

The information processing apparatus may further include a hand-shape determination unit that determines the shape of the hand including the first finger and the second finger.

An information processing method according to an embodiment of the present technology is an information processing method executed by a computer system including the following step of: controlling, on the basis of three-dimensional position information of each of a first finger and a second finger acquired from a detection result of a sensor, a threshold value relating to determination of a gesture using at least one of the first finger and the second finger.

A program according to an embodiment of the present technology causes a computer system to execute the following step of:

controlling, on the basis of three-dimensional position information of each of a first finger and a second finger acquired from a detection result of a sensor, a threshold value relating to determination of a gesture using at least one of the first finger and the second finger.

BRIEF DESCRIPTION OF DRAWINGS

FIG. 4 is a table showing the state of each finger and control of a threshold value of a second finger.

FIG. 9 is a table showing the state of each finger, the shape of a hand, and control of the threshold value of a second finger.

MODE(S) FOR CARRYING OUT THE INVENTION

Hereinafter, an embodiment according to the present technology will be described with reference to the drawings.

First Embodiment

[Operation Input System]

Figure 1:
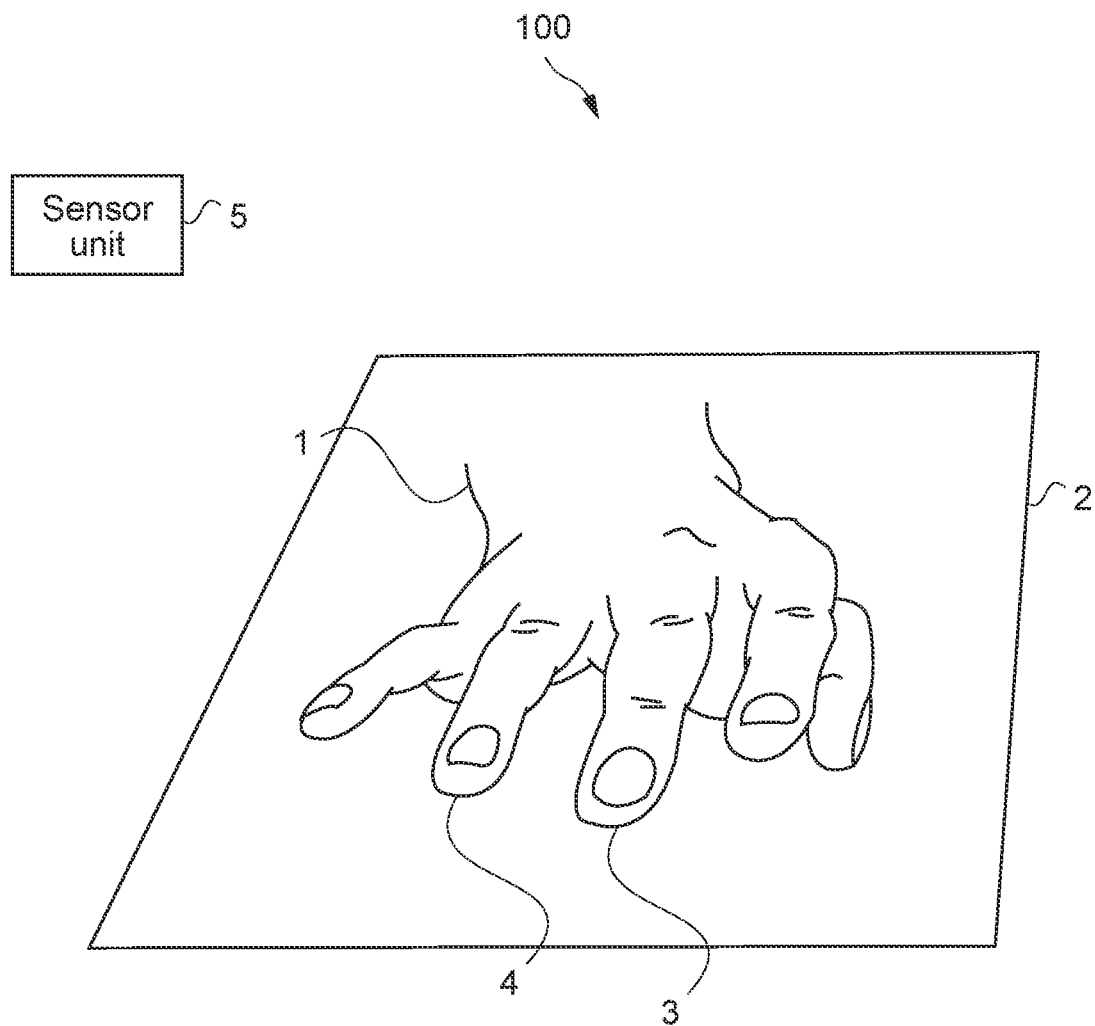
FIG. 1 is a schematic diagram describing the outline of an operation input system.

FIG. 1 is a schematic diagram describing the outline of an operation input system according to a first embodiment of the present technology.

An operation input system 100 according to the present technology is capable of controlling, three-dimensional position information of each of a first finger 3 and a second finger 4 acquired from a detection result of a sensor, a threshold value relating to determination of a gesture using at least one of the first finger 3 or the second finger 4.

The type of gesture is not limited, and it is possible to apply the present technology to determination of an arbitrary gesture.

For example, as shown in FIG. 1, it is possible to perform gesture determination with high accuracy by using the operation input system 100 by the user 1.

For example, the first finger 3 is a finger intentionally used when the user 1 performs some operation. For example, the first finger 3 is a finger used when executing a gesture. In the example shown in FIG. 1, the middle finger that touches a display object 2 (an object on which the display object 2 is displayed) is set as the first finger 3. It goes without saying that the finger set as the first finger 3 is not limited. Further, the number of first fingers 3 is also not limited. Further, the target to be operated is also not limited.

The number of first fingers 3 is also not limited. For example, in the case where the thumb and the index finger are used when enlarging the display object 2 displayed on a display or the like, it is also possible to apply the present technology with the thumb and the index finger are the first finger.

Note that the finger includes the entire finger and part of a finger. For example, the tip of a finger, the first joint, the second joint, and the base of a finger are included. Further, the hand includes the finger, the center of the palm, and the wrist.

In the example shown in FIG. 1, the second finger 4 is a finger adjacent to the first finger. Typically, the ring finger affected by the tendon pulled when the middle finger that is the first finger 3 is bent is the second finger 4. That is, it can be also said that the second finger 4 is a finger that is linked to the movement of the first finger or a finger whose movement is restricted by fixing of the first finger 3. Note that the finger set as the second finger 4 is not limited. Further, the number of second fingers 4 is also not limited.

Three-dimensional position information regarding a finger includes coordinates indicating the position of the finger, the distance between the finger and the display object 2, and the amount of movement of the finger. For example, three-dimensional position information regarding a finger is acquired with a sensor unit 5 as the origin. Note that the position of the origin is not limited. For example, the display, touch panel, screen, or the like on which the display object 2 is display may be the origin.

As position information, the absolute coordinates system (world coordinate system) may be used or a relative coordinate system with a predetermined point as a reference (origin) may be used. In the case where the relative coordinate system is used, the origin used as a reference may be arbitrarily set.

The display object 2 includes an object to be displayed on a projector, a display, or the like. For example, the display object 2 includes an image and a moving image projected on a screen, a table, or the like. It goes without saying that the present technology is not limited thereto, and a virtual image such as a hologram and a virtual object such as AR (Augmented Reality) are also included in the display object 2.

The gesture includes a predetermined operation or a predetermined shape of a hand or a finger. For example, the gesture includes a touch operation of touching the display object 2 with a finger, a slide operation of moving a finger horizontally, and a predetermined shape of a hand such as rock (the state of a hand closed) and paper (the state of a hand opened). Further, for example, an operation performed with two fingers, such as pinching and stretching, an operation of pressing and holding the display object 2, and an operation of being stationary are also included in the gesture. In addition thereto, various operations such as hand signals used in sports or the like and various shapes may be included in the gesture.

Note that in this embodiment, the term "stationary" includes being within a predetermined range with respect to a predetermination place. For example, in the case where a finger is in contact with the display object 2 and is within a predetermined range from the touched place, the finger is in the stationary state. The predetermined range is typically a sufficiently small range, but the size of the predetermined range for determining the stationary state is not limited and may be arbitrarily set.

Note that in the following description, executing a touch operation will be described as touch or touched. Further, executing a slide operation will be described as slide or slid.

As shown in FIG. 1, the operation input system 100 includes the sensor unit 5 and an information processing apparatus 10.

The sensor unit 5 and the information processing apparatus 10 are communicably connected to each other wired or wirelessly. The connection form between the respective devices is not limited. For example, wireless LAN communication such as WiFi or short-range wireless communication such as Bluetooth (registered trademark) can be used.

The sensor unit 5 is capable of detecting various types of data relating to the hand of the user 1. For example, the sensor unit 5 is realized by a microphone capable of detecting sounds generated in the surroundings, a camera capable of capturing an image of the surroundings, or the like.

For example, by using the camera, it is possible to image a gesture of the hand such as whether the first finger 3 is touching the display object 2.

For example, as the camera, an imaging apparatus such as a ToF (Time of Flight) camera, a stereo camera, a digital camera, a monocular camera, an infrared camera, a polarized camera, and another camera is used. Further, a sensor device such as a laser ranging sensor, a contact sensor, an ultrasonic sensor, LiDAR (Light Detection and Ranging, Laser Imaging Detection and Ranging), and a sonar may be used.

Figure 14:
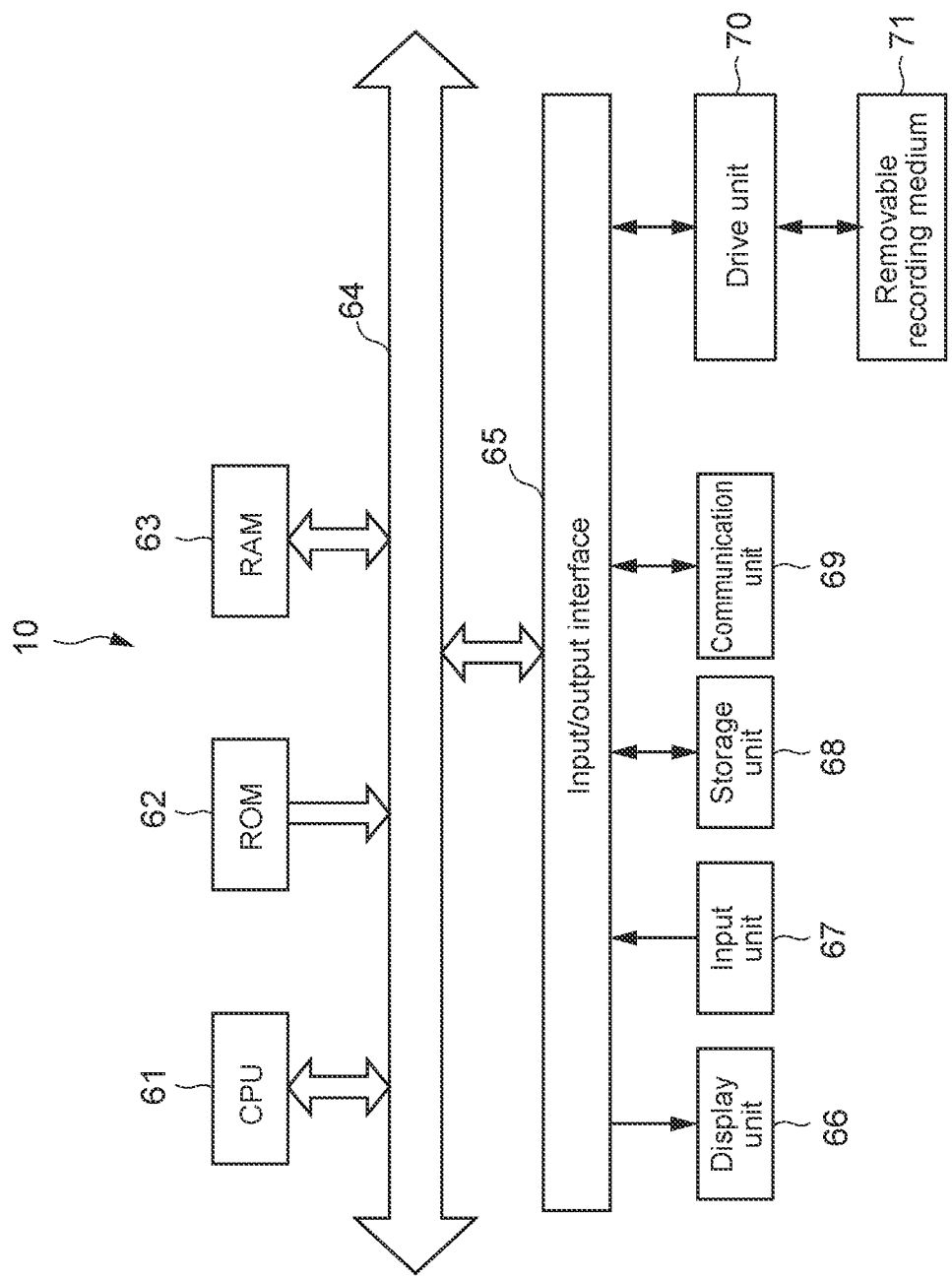
FIG. 14 is a block diagram showing a hardware configuration example of the information processing apparatus.

The information processing apparatus 10 includes hardware necessary for configuring a computer, such as a processor such as a CPU, a GPU, and a DSP, a memory such as a ROM and a RAM, and a storage device such as an HDD (see FIG. 14). For example, the CPU loads the program according to the present technology stored in the ROM or the like in advance in the RAM and executes the program, thereby executing an information processing method according to the present technology.

For example, the information processing apparatus 10 can be realized by an arbitrary computer such as a PC (Personal Computer). It goes without saying that hardware such as FPGA and ASIC may be used.

In this embodiment, when the CPU executes a predetermined program, a threshold value control unit as a functional block is configured. It goes without saying that dedicated hardware such as an IC (integrated circuit) may be used in order to realize a functional block.

The program is installed in the information processing apparatus 10 via, for example, various recording media. Alternatively, the program may be installed via the Internet or the like.

The type and the like of the recording medium on which a program is recorded is not limited, and an arbitrary computer-readable recording medium may be used. For example, an arbitrary non-transient computer-readable storage medium may be used.

The information processing apparatus 10 acquires three-dimensional position information of a finger. Note that in the present disclosure, acquisition of the three-dimensional position information of a finger includes receiving three-dimensional position information relating to a finger transmitted from the outside and generating three-dimensional position information relating to a finger by the information processing apparatus 10 itself.

The information processing apparatus 10 illustrated in FIG. 1 controls a threshold value on the basis of the generated three-dimensional position information 6 of the first finger 3 and the generated three-dimensional position information 7 of the second finger 4.

The threshold value is a value relating to determination of a gesture using at least one of the first finger 3 or the second finger 4. For example, a threshold value relating to distance from the display object 2 for determining the presence/absence of a touch operation is included. For example, in the case where the first finger 3 approaches the display object 2 at a distance of 5 mm or less that is a threshold value set in advance, it is determined that the first finger 3 has touched the display object 2. In addition, an arbitrary threshold value relating to gesture determination is included.

The control of a threshold value includes, for example, changing the size of a threshold value that has been determined. Further, the control of a threshold value includes newly setting a threshold value for determining a gesture. For example, in addition to a threshold value relating to a distance from the display object 2 for determining the presence/absence of a touch operation, a threshold value relating to a height difference from an adjacent finger is newly set. Such processing is included in the control of a threshold value.

Figure 2:
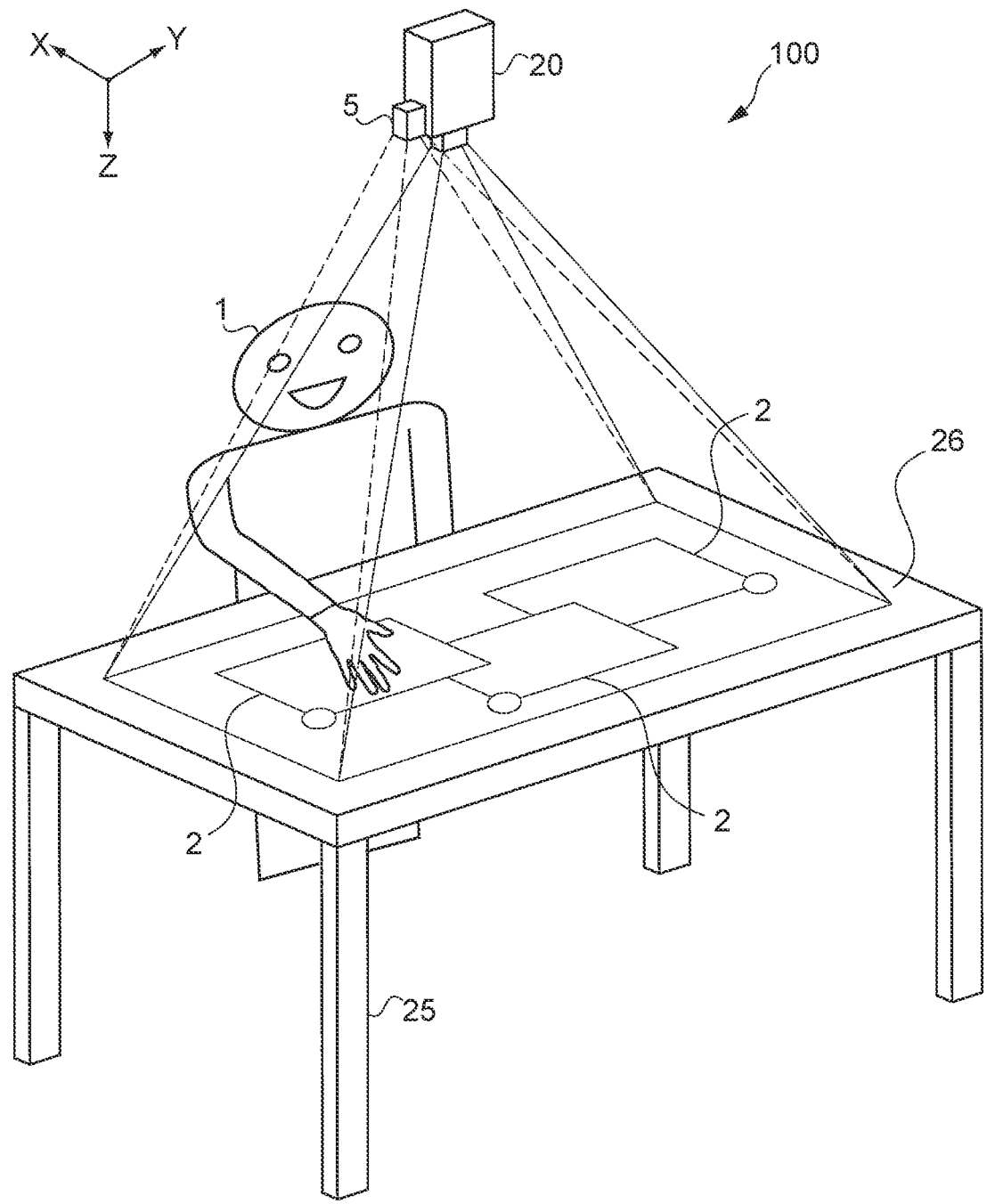
FIG. 2 is a schematic diagram showing an embodiment of the operation input system.
Figure 3:
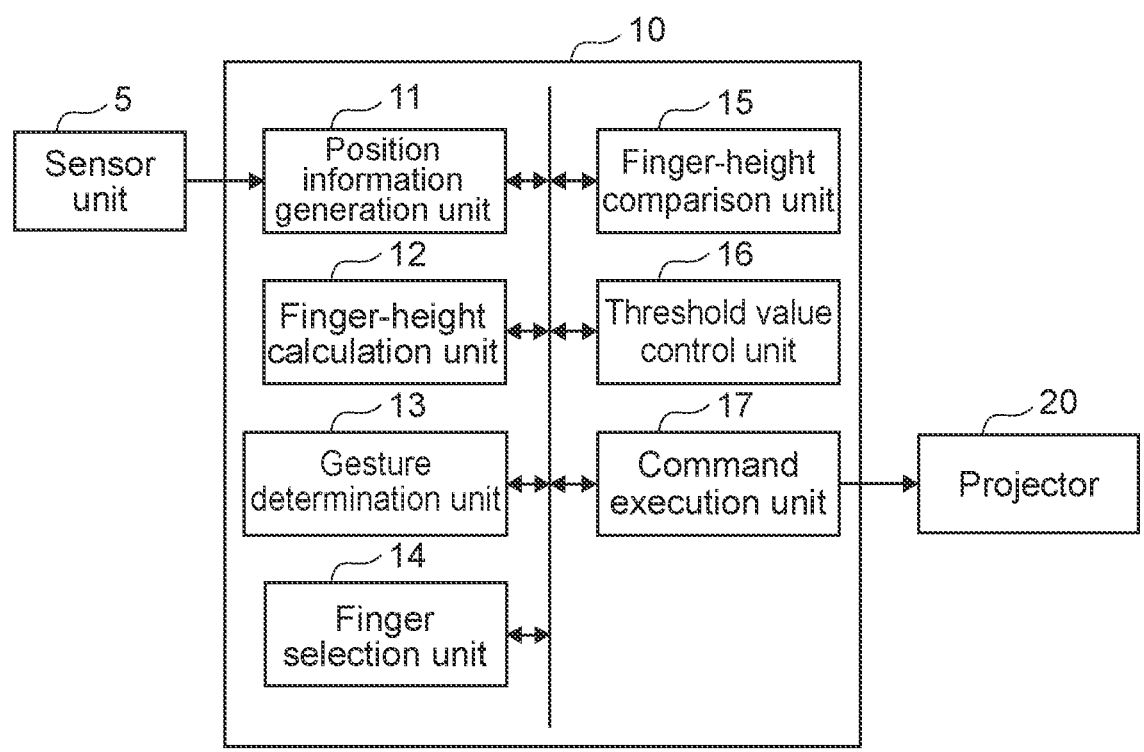
FIG. 3 is a block diagram showing a functional configuration example of the operation input system and an information processing apparatus.

FIG. 2 is a schematic diagram showing an embodiment of the operation input system 100 according to the present technology. FIG. 3 is a block diagram showing a functional configuration example of the operation input system 100 and the information processing apparatus 10.

As shown in FIG. 2, the operation input system 100 includes the sensor unit 5 and a projector 20. The operation input system 100 displays information on a table 25 and causes the user 1 to operate the display object 2 displayed on the table 25. The method of displaying the display object 2 on a top surface 26 of the table 25 in this way is referred to also as a projection type. Further, the method of displaying the display object 2 on the top surface 26 of the table 25 is referred to also as a table top screen.

The user 1 can perform, with a finger or the like, various operations on the display object 2 displayed on the table 25 by the projector 20. Further, the user 1 can place an object on the top surface 26 of the table 25 and causes the sensor unit 5 to recognizes the object, thereby causing the operation input system 100 to execute various types of processing relating to the object.

The sensor unit 5 includes at least one of an imaging device or a ranging sensor. Further, the sensor unit 5 acquires the operation performed by the user 1, the shape and pattern of the object placed on the table 25, or the like. In the example shown in FIG. 2, the sensor unit 5 and the projector 20 are provided above the table 25 while being suspended from the ceiling. The method of irradiating the table 25 from above by the projector 20 to display the display object 2 on the top surface 26 of the table 25 is referred to also as an upper projection type. As the sensor unit 5, a camera that images the table 25 with one lens may be used, a stereo camera capable of imaging the table 25 with two lenses to record information of the depth direction may be used, or a microphone for collecting the voice uttered by the user 1 and the environmental sound may be used.

Note that in this embodiment, the top surface 26 of the table 25 is parallel to the XY plane. That is, also the display object 2 displayed on the top surface 26 of the table 25 is parallel to the XY plane.

Further, in this embodiment, the sensor unit 5 is capable of detecting various types of data relating to the table 25. For example, data relating to the distance (length in the Z coordinate direction) from the sensor unit 5 to the top surface 26 of the table 25 is acquired. Note that in the following description, the Z coordinate direction will be described as the height direction.

Further, in the case where a camera that images the table 25 with one lens is used as the sensor unit 5, the captured image may be analyzed to recognize the object placed on the table 25. Further, in the case where a stereo camera is used as the sensor unit 5, the object (hand or the like) placed on the table 25 can be recognized on the basis of the height acquired by the stereo camera. Further, the operation input system 100 is capable of recognizing, on the basis of the height, the contact of the hand of the user 1 with the table 25 and the withdrawal of the hand from the table 25.

Further, in the case where a microphone is used as the sensor unit 5, a microphone array for collecting sounds in a specific direction may be used as the microphone. In the case where a microphone array is used as the sensor unit 5, the sound collection direction may be adjusted to an arbitrary direction.

The information processing apparatus 10 includes a position information generation unit 11, a finger-height calculation unit 12, a gesture determination unit 13, a finger selection unit 14, a finger-height comparison unit 15, a threshold value control unit 16, and a command execution unit 17.

The position information generation unit 11 generates three-dimensional position information of a finger. In this embodiment, three-dimensional position information of the first finger 3 and three-dimensional position information of the second finger 4 acquired from a detection result of the sensor unit 5 are generated.

Further, in this embodiment, the position information generation unit 11 generates three-dimensional position information of the first finger 3 and three-dimensional position information of the second finger 4 on the basis of various types of image data including a hand acquired by the sensor unit 5. For example, the image data includes an RGB image, an IR (Infra-Red) image, and a Depth image.

Note that an arbitrary technology (algorithm and the like) for generating three-dimensional position information may be adopted.

For example, an arbitrary machine-learning algorithm using a DNN (Deep Neural Network) or the like may be used. For example, by using AI (artificial intelligence) or the like that performs deep learning, it is possible to improve generation accuracy of the three-dimensional position information.

For example, a learning unit and an identification unit are constructed for generating the three-dimensional position information. The learning unit performs machine learning on the basis of input information (learning data) and outputs the learning result. Further, the identification unit identifies (determines, predicts, etc.) the input information on the basis of the input information and the learning result.

For example, a neural network or deep learning is used as the learning method in the learning unit. The neural network is a model that imitates a brain neural circuit of a human and includes three types of layers, i.e., an input layer, an intermediate layer (hidden layer), and an output layer.

The deep learning is a model that uses a neural network having a multilayer structure, and is capable of repeating characteristic learning in each layer and learning complex patterns hidden in a large amount of data.

The deep learning is used to, for example, identify an object in an image and a word in voice. For example, a convolutional neural network (CNN) used for recognizing an image and a moving image is used.

Further, as a hardware structure for realizing such machine learning, a neurochip/neuromorphic chip incorporating the concept of a neural network can be used.

The problem setting in machine learning includes supervised learning, unsupervised learning, semi-supervised learning, reinforcement learning, inverse reinforcement learning, active learning, and transfer learning.

For example, in the supervised learning, a feature amount is learned on the basis of given labeled learning data (teaching data). As a result, it is possible to derive a label of unknown data.

Further, in the unsupervised learning, a large amount of unlabeled learning data is analyzed to extract a feature amount, and clustering is performed on the basis of the extracted feature amount. As a result, it is possible to analyze trends and predict the future on the basis of a huge amount of unknown data.

Further, the semi-supervised learning is a mixture of the supervised learning and the unsupervised learning, and is a method of giving a huge amount of training data by the unsupervised learning after learning a feature amount by the supervised learning and repeatedly performing learning while automatically calculating a feature amount.

Further, the reinforcement learning deals with the problem that an agent in an environment observes the current state and determines what action to take. The agent obtains a reward from the environment by selecting an action and learns how to obtain the most rewards through a series of actions. By learning the optimal solution in an environment as described above, it is possible to reproduce the judgment of a human and cause a computer to learn judgment exceeding that of the human.

It is also possible to generate virtual sensing data by machine learning. For example, it is possible to predict sensing data from other sensing data and use the predicted sensing data as input information, e.g., it is possible to generate position information from the input image information.

Further, it is possible to generate different sensing data from a plurality of pieces of sensing data. Further, it is also possible to predict necessary information and generate predetermined information from sensing data.

Further, an arbitrary learning algorithm or the like different from the machine learning described above may be used.

For example, three-dimensional position information of a finger may be obtained by a rule base in which the distances between fingers in a hand are registered in advance. By generating three-dimensional position information in accordance with a predetermined learning algorithm, it is possible to improve generation accuracy of the three-dimensional position information. It goes without saying that the present technology is not limited to the case of using a learning algorithm.

Note that the application of a learning algorithm may be performed on arbitrary processing in the present disclosure.

The finger-height calculation unit 12 calculates the height of a finger. In this embodiment, on the basis of the pieces of three-dimensional position information of the first finger 3 and the second finger 4 generated by the position information generation unit 11, the distance between the table 25 and the first finger 3 and the distance between the table 25 and the second finger 4 are calculated. For example, by calculating the difference between the height of the first finger 3 and the height of the top surface 26 of the table 25, the distance between the first finger 3 and the top surface 26 of the table 25 is calculated.

Note that the height of a finger may be calculated by machine learning.

The gesture determination unit 13 determines whether or not a gesture has been executed. In this embodiment, the presence/absence of a touch operation of the first finger 3 on the display object 2 is determined. For example, in the case where the difference between the height of the first finger 3 and the height of the top surface 26 of the table 25 on which the display object 2 is displayed (distance between the table 25 and the finger) is a threshold value set in advance or less, it is determined that the first finger has touched the display object 2.

Further, in this embodiment, the gesture determination unit 13 determines the presence/absence of a slide operation of at least one of the first finger 3 or the second finger 4 on the display object 2. For example, in the case where the second finger 4 has moved in the lateral direction by a threshold value or more, it is determined that a slide operation is performed. In this embodiment, the gesture determination unit 13 determines the presence/absence of a slide operation on the basis of the amount of movement of a finger.

The amount of movement of a finger includes the amount that the finger has moved. For example, the distance (length) that the finger has moved and the time that the finger has moved are included in the amount of movement of a finger.

The finger selection unit 14 selects a finger for which the threshold value is to be adjusted. Typically, the second finger 4 adjacent to the first finger 3 touching the display object 2 is selected. For example, in the case where the first finger 3 is the middle finger, the threshold value of the ring finger is adjusted. That is, it can be also said that the finger for which the threshold value is to be adjusted is the second finger 4. Further, it can be also said that the second finger 4 is a finger that can cause an unintended erroneous operation of the user 1 when the first finger 3 is operating.

Note that the finger selected by the finger selection unit 14 may be arbitrarily set. For example, the finger may be selected by the user 1 or may be selected on the basis of the determination result of the gesture determination unit 13. The finger to be selected may be set on the basis of other various conditions. Further, a finger may be selected by performing machine learning of these conditions.

The finger-height comparison unit 15 compares the heights of fingers with each other. In this embodiment, the finger selected by the finger selection unit 14 and the finger adjacent to the selected finger are compared with each other. For example, in the case where the ring finger has been selected by the finger selection unit 14, the height of the ring finger and the height of at least one of the little finger or the middle finger adjacent to the ring finger are compared with each other.

The threshold value control unit 16 controls the threshold value relating to determination of a gesture. In this embodiment, the threshold value is controlled on the basis of pieces of three-dimensional position information of the first finger 3 and the second finger 4. For example, the threshold value of the second finger 4 is controlled on the basis of the determination result of whether or not the first finger 3 is touching from the gesture determination unit 13 and the comparison result of the height of the first finger 3 and the height of the second finger 4 from the finger-height comparison unit 15. A specific example will be described with reference to FIG. 4.

The command execution unit 17 executes a command corresponding to the gesture performed by the user 1. For example, in the case where the user 1 has moved the first finger 3 while touching the display object 2, the display object 2 is caused to move so as to follow the movement of the first finger 3. Note that the type of the command to be executed may be appropriately changed in accordance with the application to be executed.

The projector 20 is capable of outputting various display objects 2. In this embodiment, the projector 20 outputs the display object 2 on the top surface 26 of the table 25 on the basis of the command to be executed by the command execution unit 17. Note that the area in which the display object 2 is output by the projector 20 is not limited to the top surface 26 of the table 25. For example, the area in which the display object 2 is output by the projector 20 may be a floor surface, a wall surface, or an object. Further, the projector 20 may include a speaker, a lighting device, and the like.

In this embodiment, the gesture determination unit 13 corresponds to a touch determination unit that determines presence/absence of the touch operation of at least one of the first finger or the second finger on the object.

In this embodiment, the threshold value control unit 16 corresponds to a threshold value control unit that controls, on the basis of three-dimensional position information of each of a first finger and a second finger acquired from a detection result of a sensor, a threshold value relating to determination of a gesture using at least one of the first finger and the second finger.

In this embodiment, the display object 2 corresponds to an object.

FIG. 4 is a table showing the state of each finger and control of a threshold value of the second finger 4.

Note that in this embodiment, the little finger, the ring finger, and the middle finger are focused on, considering the structure of a hand, which is affected by the tendons pulled by bending fingers. It goes without saying that the threshold value may be controlled with respect to the state of the thumb or the index finger. Further, the threshold value may be controlled from various states in consideration of other reasons.

As shown in FIG. 4, in the case where the ring finger has been selected by the finger selection unit 14, the height of the ring finger and the height of the little finger are compared with each other by the finger-height comparison unit 15. For example, in the case where the little finger is lower than the ring finger and the little finger is touching the display object 2, the threshold value of the ring finger is reduced (lowered)

by the threshold value control unit 16. In this case, the little finger corresponds to the first finger 3 and the ring finger corresponds to the second finger 4.

In the case where the little finger or the middle finger has been selected by the finger selection unit 14, the height of the middle finger and the height of the ring finger are compared with each other by the finger-height comparison unit 15. For example, in the case where the ring finger is lower than the little finger or the middle finger and the ring finger is touching the display object 2, the threshold value of the little finger or the middle finger is reduced by the threshold value control unit 16. In this case, the ring finger corresponds to the first finger 3, and the little finger and the middle finger each correspond to the second finger 4. Note that in the case where the ring finger is lower than the little finger or the middle finger and is touching the display object 2, the threshold value of at least one of the little finger or the middle finger may be reduced by the threshold value control unit 16.

In the case where the ring finger has been selected by the finger selection unit 14, the height of the ring finger and the height of the middle finger are compared with each other by the finger-height comparison unit 15. For example, in the case where the middle finger is lower than the ring finger and the middle finger is touching the display object 2, the threshold value of the ring finger is reduced by the threshold value control unit 16. In this case, the middle finger corresponds to the first finger 3 and the ring finger corresponds to the second finger 4.

In the case where the ring finger has been selected by the finger selection unit 14, the height of the little finger and the height of the middle finger are compared with each other by the finger-height comparison unit 15. For example, in the case where the little finger is lower than the ring finger and the little finger is touching the display object 2 and where the middle finger is lower than the ring finger and the middle finger is touching the display object 2, the threshold value of the ring finger is reduced by the threshold value control unit 16. In this case, the little finger and the middle finger each correspond to the first finger 3, and the ring finger corresponds to the second finger 4. Further, in the case where the little finger is lower than the ring finger and the little finger is touching the display object 2 and where the middle finger is lower than the ring finger and the middle finger is touching the display object 2, the threshold value of the ring finger may be further reduced.

Figure 5:
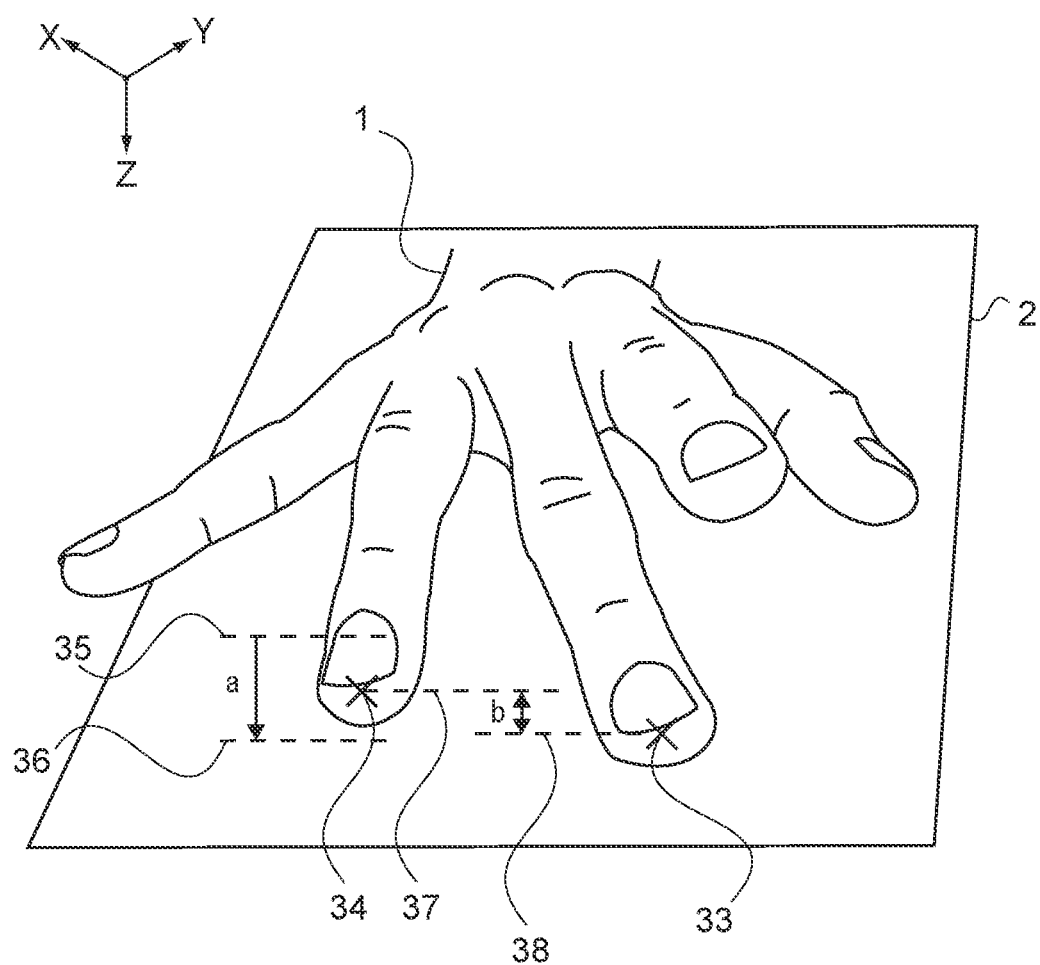
FIG. 5 is a schematic diagram showing a specific example of setting of a threshold value.

FIG. 5 is a schematic diagram showing a specific example of setting of a threshold value. As shown in FIG. 5, a point 33 is a point schematically representing the coordinates indicating the position of the middle finger. Further, a point 34 is a point schematically representing the coordinates indicating the position of the ring finger.

As shown in FIG. 5, a dotted line 35 is a line indicating the threshold value when it is determined that the finger has touched the display object 2. That is, the dotted line 35 is a line indicating the threshold value before the threshold value is controlled by the threshold value control unit 16. Further, the user 1 touches the display object 2 with the middle finger as the first finger 3. In this case, as shown in FIG. 4, the threshold value of the ring finger is controlled to be low by the threshold value control unit 16.

For example, the threshold value control unit 16 controls the threshold value of the ring finger shown by the dotted line 35 to be low by a length a in the direction of the display object 2 (Z-axis direction). For example, assumption is made that the threshold value of the ring finger from the display object 2 to the dotted line 35 is 6 mm. That is, when the ring finger is located at a position above the display object 2 and below the dotted line 35, the gesture determination unit 13 determines that the ring finger has touched the display object 2.

At this time, in the case where the middle finger is touching the display object 2, the threshold value control unit 16 controls the threshold value of the ring finger to decrease by 3 mm, reaching 3 mm. That is, the gesture determination unit 13 determines, when the ring finger is lower than the position of a dotted line 36, that the ring finger has touched the display object 2.

Further, as an example of another method of setting a threshold value, the threshold value control unit 16 newly sets, in the case where the middle finger is touching the display object 2, a difference in the distance between the ring finger and the middle finger as a threshold value for determining the presence/absence of a touch operation of the ring finger on the display object 2.

As shown in FIG. 5, a dotted line 37 is a line indicating the height of the ring finger. Further, a dotted line 38 is a line indicating the height of the middle finger. That is, a difference in the distance between the ring finger and the middle finger is the distance between the dotted line 37 and the dotted line 38 and the newly set threshold value.

For example, the threshold value control unit 16 sets the distance between the dotted line 37 and the dotted line 38 to a length b. That is, in the case where the distance between the ring finger and the middle finger is shorter than the length b, the gesture determination unit 13 determines that the ring finger has touched the display object 2.

By controlling the value of the length a and/or the length b, it is possible to make the determination of whether or not the ring finger has touched the display object 2 strict. That is, it is possible to prevent touching of the ring finger (erroneous operation) unintended by the user 1 when the middle finger is touching the display object 2 from occurring. Further, by controlling the value of the length b that is the relative distance between the middle finger and the ring finger, it is possible to prevent touching of the ring finger (erroneous operation) unintended by the user 1 in the case where the height of the table 25 on which the display object 2 is to be projected cannot be accurately generated, for example.

Note that the method of setting a threshold value is not limited, and the threshold value may be set in accordance with various conditions. For example, a threshold value such as the length a and the length b may be set for each finger. Further, for example, in the case where the middle finger and the little finger are touching the display object 2, the threshold value may be controlled to be lower than that in the case where only the middle finger is touching the display object 2.

Further, a threshold value may be set in accordance with the application to be executed. For example, in an application that is not expected to operate with three or more fingers, in the case where it is determined that two fingers are touching the display object 2, the threshold value relating to determination of a touch operation of a finger other than the touching finger may be eliminated (may be controlled to 0 mm). Further, for example, a threshold value may be set in accordance with the physical difference of the user 1 such as a child and an adult.

Figure 6:
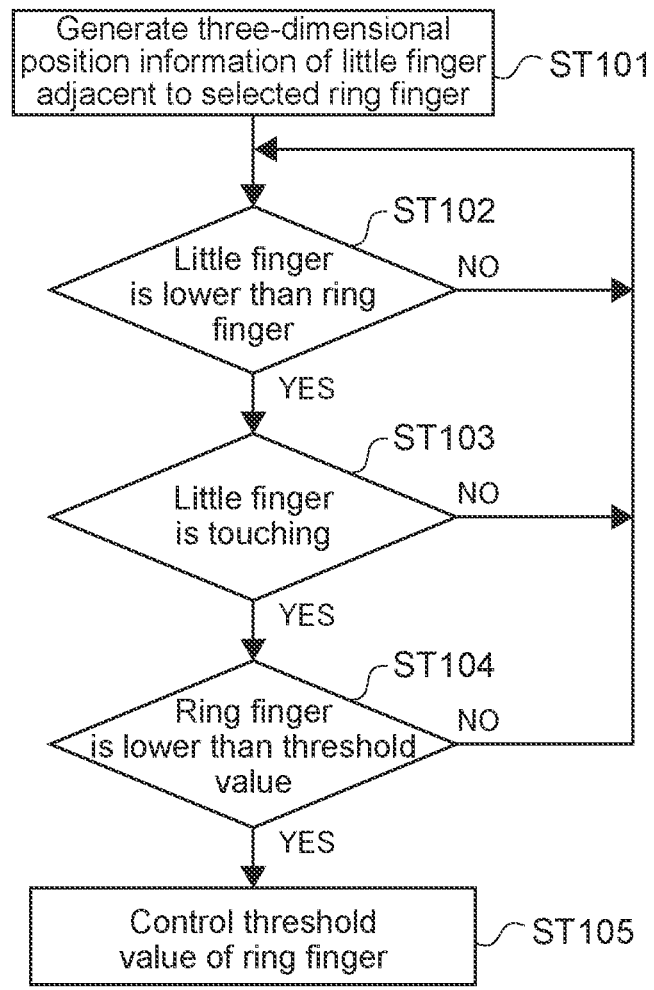
FIG. 6 is a flowchart showing an example of control of a threshold value.

FIG. 6 is a flowchart showing an example of control of a threshold value.

The finger selection unit 14 selects the ring finger. Three-dimensional position information of the little finger adjacent to the ring finger selected by the finger selection unit 14 is generated by the position information generation unit 11 (Step 101).

The finger-height calculation unit 12 calculates the heights of the little finger and the ring finger. The finger-height comparison unit 15 performs comparison as to whether or not the little finger is lower than the ring finger (Step 102).

In the case where the little finger is lower than the ring finger (YES in Step 102), the gesture determination unit 13 determines whether or not the little finger is touching the display object 2 (Step 103).

In the case where the little finger is touching the display object 2 (YES in Step 103), the gesture determination unit 13 determines whether or not the ring finger is lower than the threshold value set in advance (Step 104).

In the case where it is determined that the ring finger is lower than the threshold value (YES in Step 104), the threshold value control unit 16 controls the threshold value of the ring finger (Step 105).

In the case where NO in each of Step 102 to Step 104 is executed, the processing returns to Step 102.

Note that the order of each Step is not limited. For example, the comparison of the heights of the little finger and the ring finger in Step 102 and the determination of a touch operation of the little finger in Step 103 may be replaced with each other. Further, a Step for determining whether or not control of a threshold value is appropriate may be added. For example, after the threshold value of the ring finger is controlled in Step 105, determination of a touch operation of the ring finger may be executed. In this case, in the case where it is determined that the ring finger is touching the display object 2, the processing may return to Step 105 and the threshold value of the ring finger may be further controlled.

Further, also the finger for which three-dimensional position information is generated when the ring finger has been selected is not limited. For example, three-dimensional position information of the middle finger may be generated, and comparison of the heights of the middle finger and the ring finger and determination of a touch operation of the middle finger may be executed.

Figure 7:
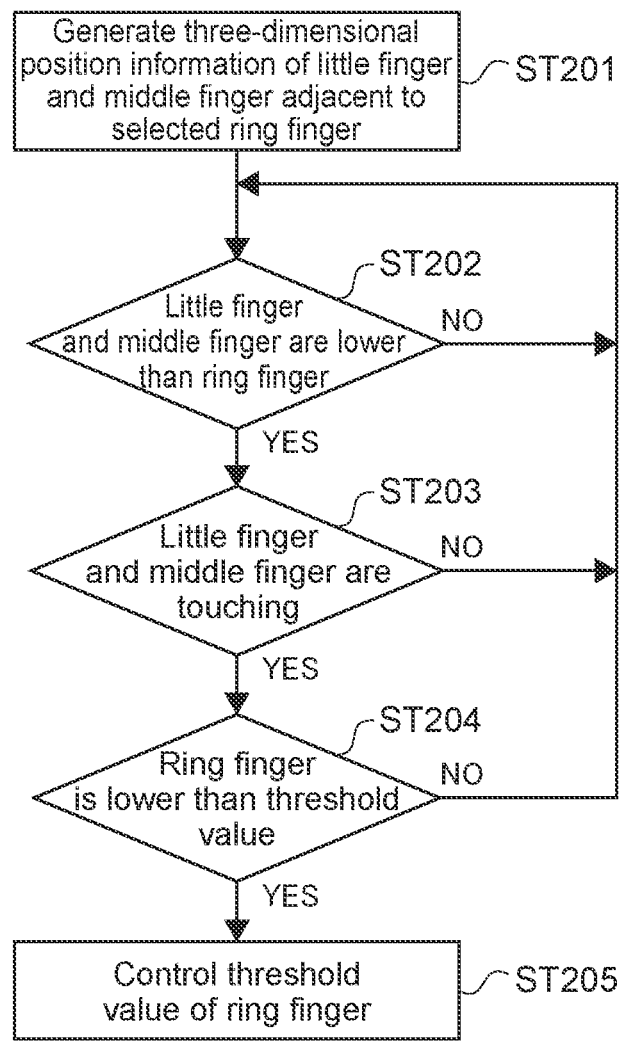
FIG. 7 is a flowchart showing another example of the control of a threshold value.

FIG. 7 is a flowchart showing another example of the control of a threshold value.

The finger selection unit 14 selects the ring finger. Pieces of three-dimensional position information of the little finger and the middle finger adjacent to the ring finger selected by the finger selection unit 14 are generated by the position information generation unit 11 (Step 201).

The finger-height calculation unit 12 calculates the heights of the little finger, the middle finger, and the ring finger. The finger-height comparison unit 15 performs comparison as to whether or not the little finger and the middle finger are lower than the ring finger (Step 202).

In the case where the little finger and the middle finger are lower than the ring finger (YES in Step 202), the gesture determination unit 13 determines whether or not the little finger and the middle finger are touching the display object 2 (Step 203).

In the case where the little finger and the middle finger are touching the display object 2 (YES in Step 203), the gesture determination unit 13 determines whether or not the ring finger is lower than the threshold value set in advance (Step 204).

In the case where the ring finger is lower than the threshold value (YES in Step 204), the threshold value control unit 16 controls the threshold value of the ring finger (Step 205). In this embodiment, since the little finger and the middle finger are touching the display object 2, the threshold value is further reduced than the decrease in the threshold value of the ring finger in the case where only the little finger is touching.

In the case where NO in each of Step 202 to Step 204 is executed, the processing returns to Step 202.

Note that the order of each Step is not limited. For example, comparison of the heights of the little finger and the middle finger and the height of the ring finger in Step 202 and determination of a touch operation of the little finger and the middle finger in Step 203 may be replaced with each other. Further, a Step for determining whether or not control of a threshold value is appropriate may be added. For example, after the threshold value of the ring finger is controlled in Step 205, determination of a touch operation of the ring finger may be executed. IN this case, in the case where it is determined that the ring finger is touching the display object 2, the processing may return to Step 205 and the threshold value of the ring finger may be further controlled.

As described above, the information processing apparatus 10 according to this embodiment controls, on the basis of three-dimensional position information of each of the first finger 3 and the second finger 4 acquired from a detection result of the sensor unit 5, a threshold value relating to determination of a gesture using at least one of the first finger 3 or the second finger 4. As a result, it is possible to perform gesture determination with high accuracy.

In a system in which a touch operation is input, such as a table top screen, the distance of each finger from the table is estimated. In the case where the distance of each finger from the table is a threshold value or less, it is determined that a touch operation on the display object projected on the table has been executed.

However, in the case where the middle finger touches, the adjacent fingers, i.e., the ring finger and the index finger, are located at low positions due to the structure of the hand. In this case, since the adjacent fingers are located at low positions, an erroneous operation is likely to be input.

In this regard, in the present technology, in the case where a finger is touching, the threshold value of the adjacent finger relating to determination of a gesture is controlled. As a result, it is possible to perform gesture determination with high accuracy.

Second Embodiment

An information processing apparatus 40 according to a second embodiment of the present technology will be described. In the following description, description of configurations and operations similar to those in the information processing apparatus 10 described in the first embodiment will be omitted or simplified.

In the first embodiment, the threshold value control unit 16 has controlled the threshold value on the basis of comparison of the heights of the finger selected by the finger selection unit 12 and the finger adjacent to the selected finger and determination of a touch operation of a finger.

In the second embodiment, in addition to the first embodiment, a hand-shape determination unit 41 determines the shape of the hand of the user 1. Further, the threshold value control unit 16 controls the threshold value in accordance with the shape of the hand.

Figure 8:
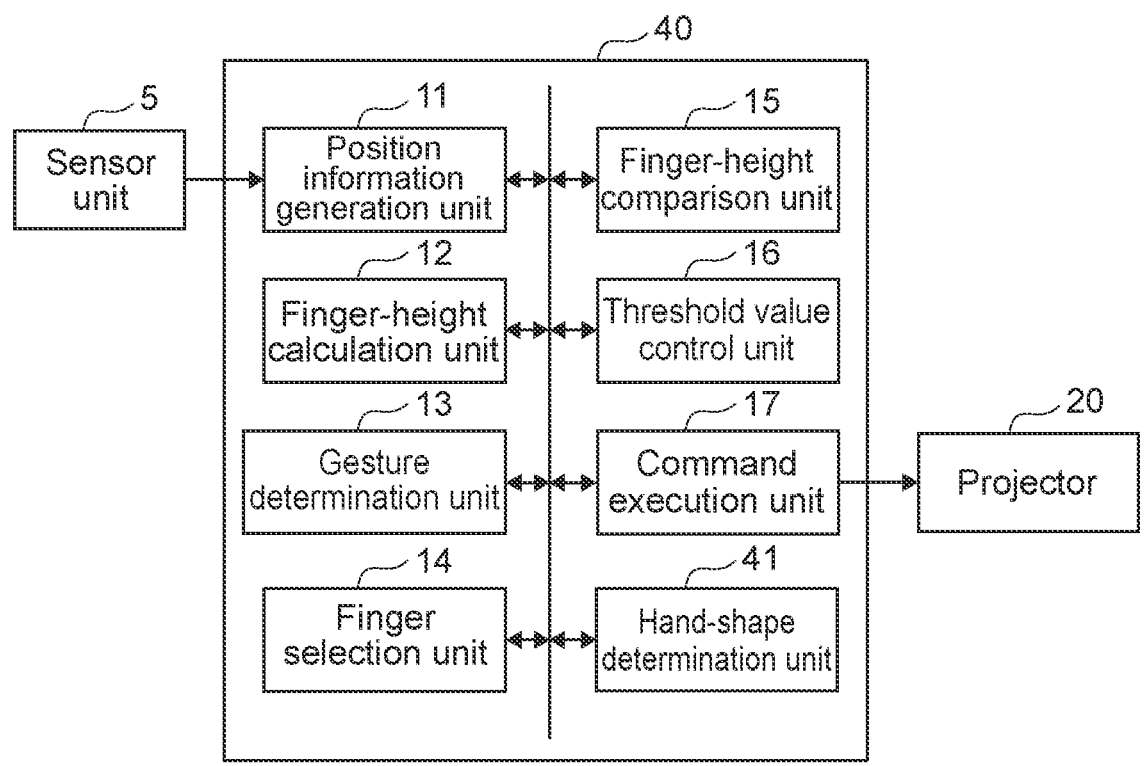
FIG. 8 is a block diagram showing a functional configuration example of the information processing apparatus.

FIG. 8 is a block diagram showing a functional configuration example of the information processing apparatus 40 according to the second embodiment of the present technology.

The information processing apparatus 40 includes the position information generation unit 11, the finger-height calculation unit 12, the gesture determination unit 13, the finger selection unit 14, the finger-height comparison unit 15, the threshold value control unit 16, the command execution unit 17, and the hand-shape determination unit 41.

The hand-shape determination unit 41 determines the shape of the hand. In this embodiment, the shape of the hand when the user 1 touches the display object 2 is determined on the basis of the sensing result acquired by the sensor unit 5 or three-dimensional position information generated by the position information generation unit 11. The shape of the hand includes various shapes such rock (the state of a hand closed), scissors (the state in which only the index finger and the middle finger are extended), and paper (the state of a hand opened).

Further, in this embodiment, the shape of the hand is determined by machine learning. For example, an arbitrary machine-learning algorithm using a DNN or the like may be used. For example, by using AI (artificial intelligence) or the like that performs deep learning, it is possible to improve determination accuracy of the shape of the hand. Further, for example, a convolutional neural network used for recognizing an image and a moving image is used.

The present technology is not limited thereto, and the shape may be recognized by using a rule base registered in advance on the basis of the number of tips, the tips from the texture of the hand being the fingertips. Further, skeleton estimation may be executed. The skeleton estimation is also called bone estimation or skeleton estimation and can be executed using a well-known technology.

Note that in this embodiment, the hand-shape determination unit 41 corresponds to a hand-shape determination unit that determines the shape of the hand including the first finger and the second finger.

FIG. 9 is a table showing the state of each finger, the shape of a hand, and control of the threshold value of the second finger 4.

As shown in FIG. 9, in the case where the finger selection unit 14 has selected the ring finger, the finger-height comparison unit 15 compares the height of the ring finger with the height of the little finger. For example, in the case where the little finger is lower than the ring finger, the little finger is touching the display object 2, and the shape of the hand is paper, the threshold value control unit 16 reduces the threshold value of the ring finger.

In the case where the finger selection unit 14 has selected the little finger or the middle finger, the finger-height comparison unit 15 compares the height of the little finger or the middle finger with the height of the ring finger. For example, in the case where the ring finger is lower than the little finger or the middle finger, the ring finger is touching the display object 2, and the shape of the hand is paper, the threshold value control unit 16 reduces the threshold value of the little finger or the middle finger. Note that in the case where the ring finger is lower than the little finger or the middle finger and is touching the display object 2, the threshold value control unit 16 may reduce the threshold value of at least one of the little finger or the middle finger.

In the case where the finger selection unit 14 has selected the ring finger, the finger-height comparison unit 15 compares the height of the ring finger with the height of the middle finger. For example, in the case where the middle finger is lower than the ring finger, the middle finger is touching the display object 2, and the shape of the hand is paper, the threshold value control unit 16 reduces the threshold value of the ring finger.

In the case where the finger selection unit 14 has selected the ring finger, the finger-height comparison unit 15 compares the height of the ring finger with the heights of the little finger and the middle finger. For example, in the case where the little finger is lower than the ring finger and the little finger is touching the display object 2 and where the middle finger is lower than the ring finger, the middle finger is touching the display object 2, and the shape of the hand is paper, the threshold value control unit 16 reduces the threshold value of the ring finger. Further, in the case where the little finger is lower than the ring finger, the little finger is touching the display object 2, the middle finger is lower than the ring finger, and the middle finger is touching the display object 2, the threshold value of the ring finger may be further reduced.

Note that the shape of the hand may be arbitrarily set. Further, the threshold value may be arbitrarily controlled on the basis of the shape of the hand.

Figure 10:
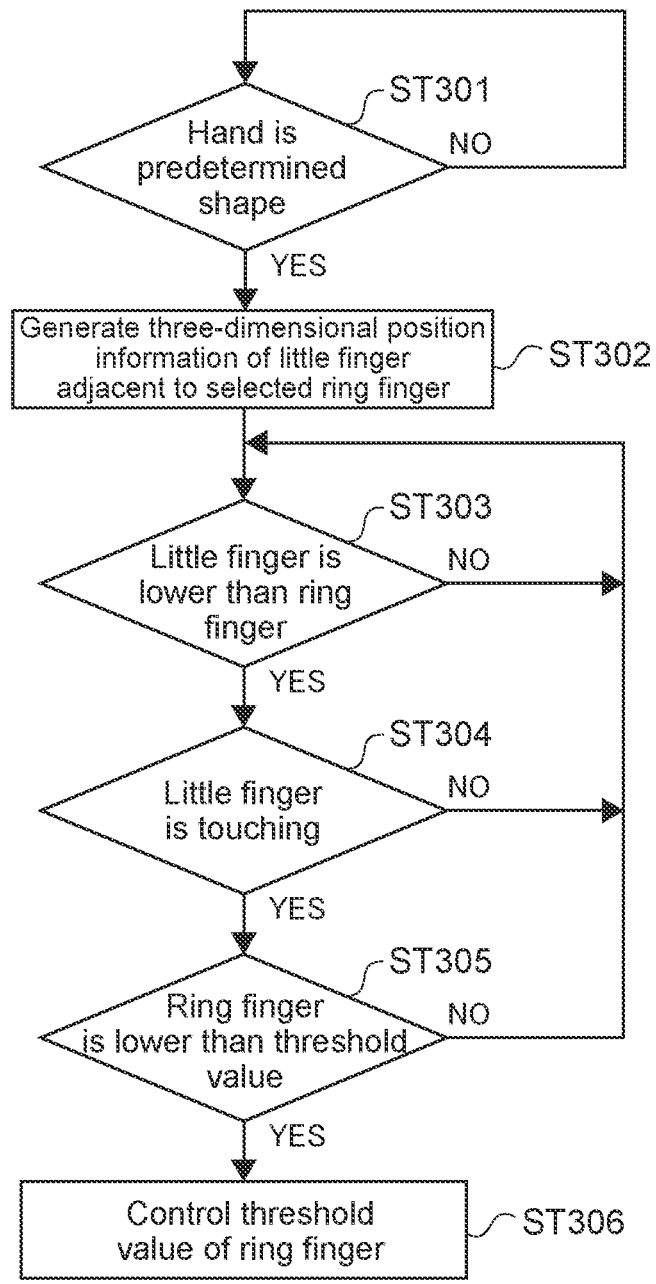
FIG. 10 is a flowchart showing an example of the control of a threshold value.

FIG. 10 is a flowchart showing an example of the control of a threshold value.

The hand-shape determination unit 41 determines whether or not the shape of the hand of the user 1 is a predetermined shape (Step 301).

In the case where it is determined that the shape of the user 1 is the predetermined shape (YES in Step 301), the finger selection unit 14 selects the ring finger. Three-dimensional position information of the little finger adjacent to the selected ring finger is generated by the position information generation unit 11 (Step 302).

The finger-height calculation unit 12 calculates the heights of the little finger and the ring finger. The finger-height comparison unit 15 performs comparison as to whether or not the little finger is lower than the ring finger (Step 303).

In the case where the little finger is lower than the ring finger (YES in Step 303), the gesture determination unit 13 determines whether or not the little finger is touching the display object 2 (Step 304).

In the case where the little finger is touching the display object 2 (YES in Step 304), the gesture determination unit 13 determines whether or not the ring finger is lower than the threshold value set in advance (Step 305).

In the case where it is determined that the ring finger is lower than the threshold value (YES in Step 305), the threshold value control unit 16 controls the threshold value of the ring finger (Step 306).

In the case where NO in Step 301 is executed, the processing returns to Step 301. Further, NO in each of Step 303 to Step 305 is executed, the processing returns to Step 303.

Note that the order of each Step is not limited. For example, comparison of the heights of the little finger and the ring finger in Step 303 and determination of a touch operation of the little finger in Step 304 may be replaced with each other. Further, for example, determination of the shape of the hand in Step 301 and comparison of the heights of the little finger and the ring finger in Step 303 may be replaced with each other.

Further, a Step for determining whether or not control of a threshold value is appropriate may be added. For example, after the threshold value of the ring finger is controlled in Step 306, determination of a touch operation of the ring finger may be executed. In this case, in the case where it is determined that the ring finger is touching the display object 2, the processing may return to Step 306 and the threshold value of the ring finger may be further controlled.

Further, also the finger for which three-dimensional position information is generated when the ring finger has been selected is not limited. For example, three-dimensional position information of the middle finger may be generated, and comparison of the heights of the middle finger and the ring finger and determination of a touch operation of the middle finger may be executed.

Figure 11:
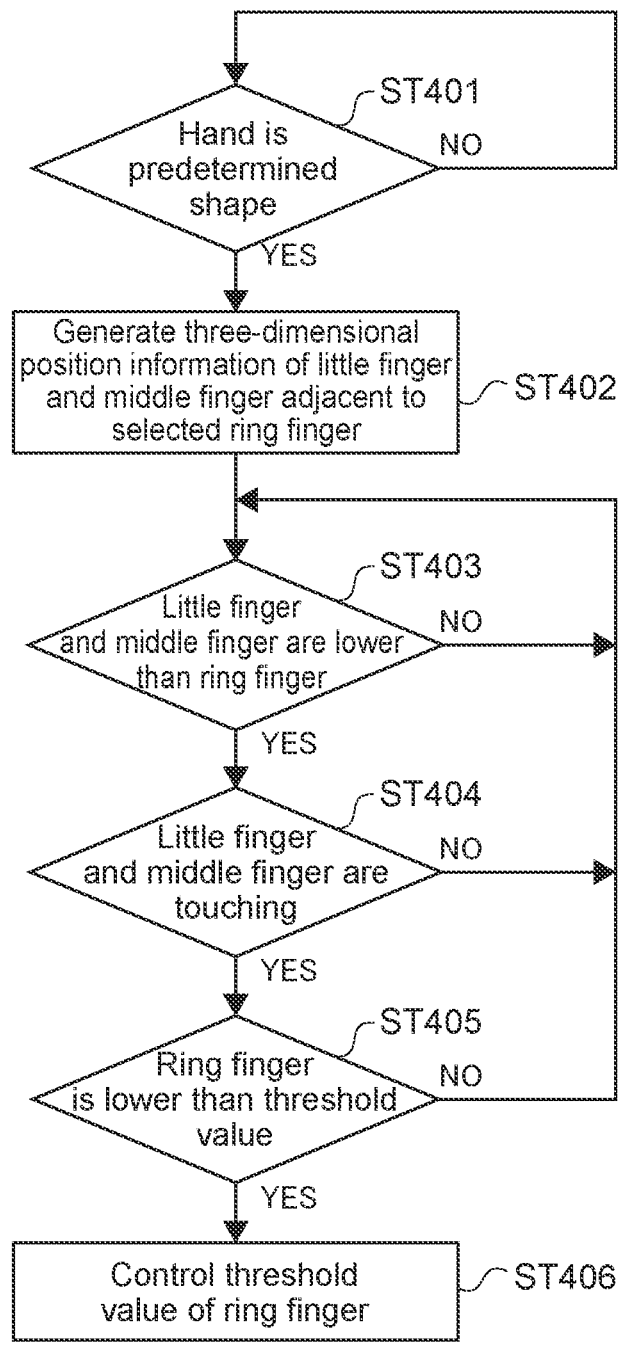
FIG. 11 is a flowchart showing another example of the control of a threshold value.

FIG. 11 is a flowchart showing another example of the control of a threshold value.

The hand-shape determination unit 41 determines whether or not the shape of the hand of the user 1 is a predetermined shape (Step 401).

In the case where it is determined that the hand of the user 1 is in the predetermined shape (YES in Step 401), the finger selection unit 14 selects the ring finger. Pieces of three-dimensional position information of the little finger and the middle finger adjacent to the selected ring finger are generated by the position information generation unit 11 (Step 402).

The finger-height calculation unit 12 calculates the heights of the little finger and the middle finger and the height of the ring finger. The finger-height comparison unit 15 performs comparison as to whether or not the little finger and the middle finger are lower than the ring finger (Step 403).

In the case where the little finger and the middle finger are lower than the ring finger (YES in Step 403), the gesture determination unit 13 determines whether or not the little finger and the middle finger are touching the display object 2 (Step 404).

In the case where the little finger and the middle finger are touching the display object 2 (YES in Step 404), the gesture determination unit 13 determines whether or not the ring finger is lower than the threshold value set in advance (Step 405).

In the case where it is determined that the ring finger is lower than the threshold value (YES in Step 405), the threshold value control unit 16 controls the threshold value of the ring finger (Step 406). In this embodiment, since the little finger and the middle finger are touching the display object 2, the threshold value is further reduced than the decrease in the threshold value of the ring finger in the case where only the little finger is touching.

Note that the order of each Step is not limited. For example, comparison of the heights of the little finger and the middle finger and the height of the ring finger in Step 403 and determination of a touch operation of the little finger and the middle finger in Step 404 may be replaced with each other. Further, for example, determination of the shape of the hand in Step 401 and comparison of the heights of the little finger and the middle finger and the height of the ring finger in Step 403 may be replaced with each other.

Further, a Step for determining whether or not control of a threshold value is appropriate may be added. For example, after the threshold value of the ring finger is controlled in Step 406, determination of a touch operation of the ring finger may be executed. In this case, in the case where it is determined that the ring finger is touching the display object 2, the processing may return to Step 406 and the threshold value of the ring finger may be further controlled.

The reduction (decrease) in the threshold value when performing touching can be also said that the operation of the user 1 becomes difficult to input. For this reason, there is a possibility that the usability is improved by not controlling the threshold value depending on the application to be executed or the shape of the hand.

In the second embodiment, the hand-shape determination unit 41 determines the shape of the hand of the user 1 and thus, the threshold value is controlled only in the case where the hand is in a predetermined shape such as paper. As a result, it is possible to improve the usability.

Third Embodiment

In the embodiments described above, the operation of touching the display object 2 has been performed as a gesture performed by the user 1. In a third embodiment, in addition to cancellation of determination of a touch operation and touching of moving a finger up and down (in the Z-axis direction) as shown in FIG. 5, an operation of moving a finger in the lateral direction (X-axis and Y-axis direction) (a slide operation) is performed.

Figure 12:
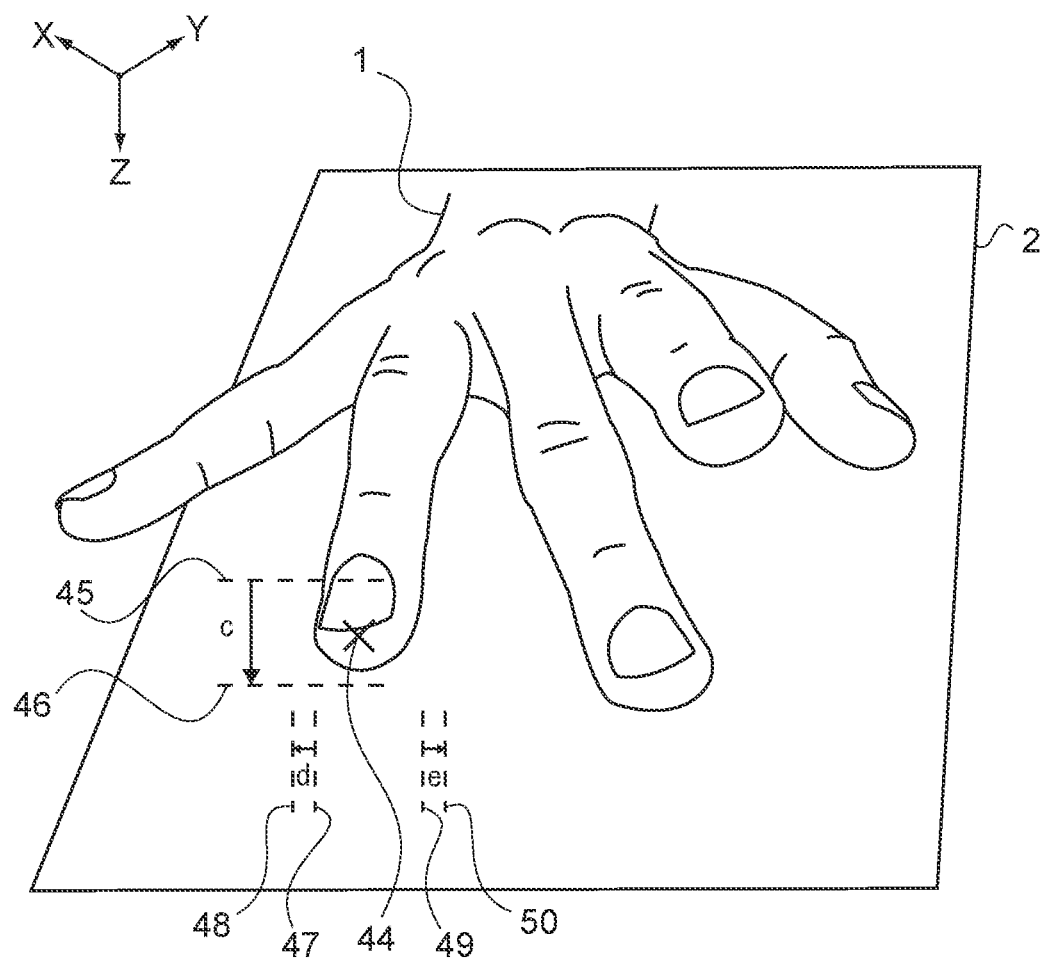
FIG. 12 is a schematic diagram showing a specific example of setting of a threshold value.

FIG. 12 is a schematic diagram showing a specific example of setting of a threshold value according to a third embodiment.

As shown in FIG. 12, a point 44 is a point schematically representing the coordinates indicating the position of the ring finger. Further, a dotted line 45 is a line indicating the threshold value when it is determined that the finger has touched the display object 2.

In FIG. 12, the situation in which the user 1 separates, in the case where the middle finger and the ring finger are touching the display object 2, the ring finger from the display object 2 is illustrated. That is, the user 1 desires to cancel determination of a touch operation of the ring finger.

In this case, the threshold value control unit 16 controls the threshold value relating to the distance for determining the presence/absence of a touch operation of the ring finger. In this embodiment, the threshold value control unit 16 reduces the threshold value of the ring finger indicated by the dotted line 45 by a length c in the direction of the display object 2 (Z-axis direction).

For example, assumption is made that the threshold value of the ring finger from the display object 2 to the dotted line 45 is 6 mm. That is, when the ring finger is located at a position from the display object 2 to the dotted line 45, the gesture determination unit 13 determines that the ring finger has touched the display object 2. The threshold value control unit 16 controls the threshold value of the ring finger to decrease by 4 mm, reaching 2 mm. That is, the gesture determination unit 13 determines, in the case where the ring finger is farther from the display object 2 than the position of a dotted line 46, that the ring finger is not touching the display object 2.

Further, in FIG. 12, the situation in which the ring finger is slid in the X-axis and Y-axis direction in the case where the middle finger and the ring finger are touching the display object 2 is illustrated. For example, the user 1 executes, in the case where he/she desired to scroll or move the display object 2, a slide operation on the display object 2.

Here, a dotted line 47 (49) and a dotted line 48 (50) are each a line indicating the threshold value for determining a slide operation of the ring finger. In this embodiment, the distance from the dotted line 47 to the dotted line 48 is a length d, and the distance from the dotted line 49 to the dotted line 50 is a length e. That is, the gesture determination unit 13 determines, in the case where the ring finger moves by the distance of the length d or the length e, that the ring finger has performed a slide operation.

In the case where it is determined that a touch operation of the middle finger has been performed, the threshold value control unit 16 controls the length d and the length e that are threshold values. Note that setting of the control of the length d and the length e is not limited. For example, the length d and the length e may be controlled to different distances or the distances of the length d and the length e may be similarly controlled. Further, the length d and the length e may be equal distances.

Figure 13A:
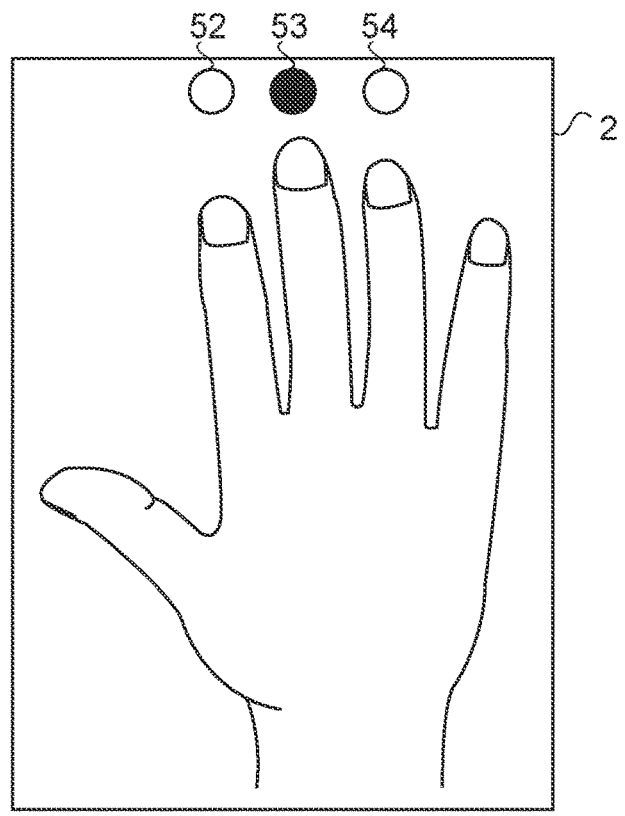
FIGS. 13A, 13B, and 13C are schematic diagrams showing a specific example in which a scroll operation is performed.
Figure 13B:
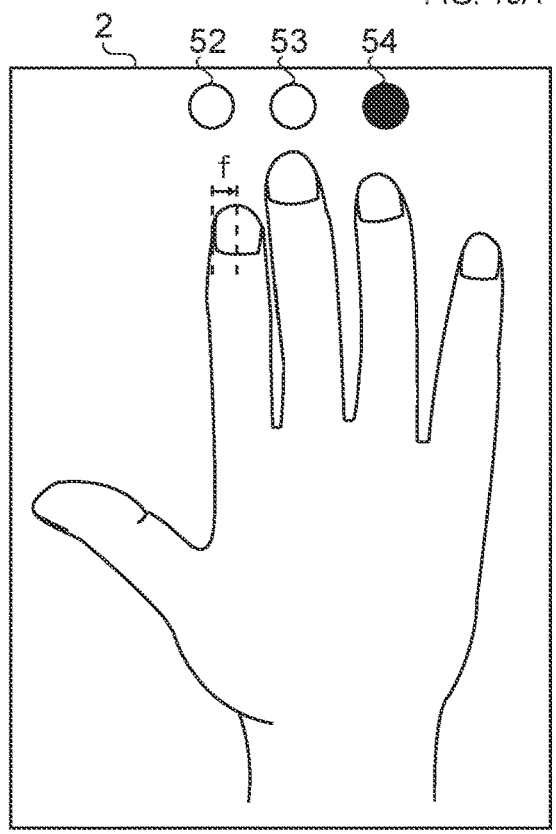
Figure 13C:
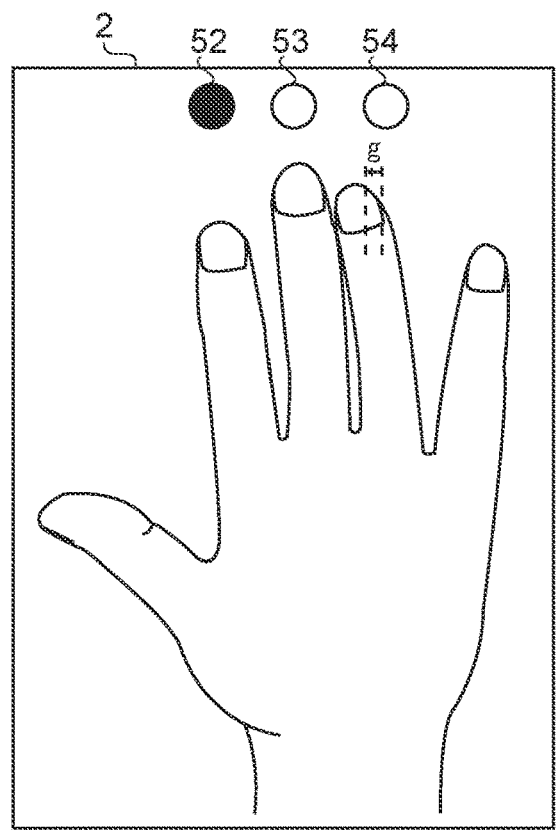

FIGS. 13A, 13B, and 13C are schematic diagrams showing a specific example in which a scroll operation is performed.

FIG. 13A is a schematic diagram in which the middle finger executes a touch operation. As shown in FIG. 13A, when the middle finger touches the display object 2, a button 53 (black circle), of three button 52, 53, and 54, is selected. Further, in this embodiment, the middle finger is in contact with (touches) the display object 2 and is in the stationary state.

FIG. 13B is a schematic diagram in which the index finger executes a slide operation. As shown in FIG. 13B, assumption is made that the index finger approaches the middle finger by a length f. That is, the gesture determination unit 13 determines, in the case where the index finger moves by the distance of the threshold value f or more, that the index finger has performed a slide operation. When the index finger has executed a slide operation in the direction of the middle finger, the command execution unit 17 selects the button 54.

FIG. 13C is a schematic diagram in which the ring finger executes a slide operation. As shown in FIG. 13C, assumption is made that the ring finger approaches the middle finger by a length g. That is, the gesture determination unit 13 determines, in the case where the ring finger moves by the distance of the threshold value g or more, that the index finger has performed a slide operation.

In the case where the gesture determination unit 13 determines that the middle finger is touching the display object 2, the threshold value control unit 16 controls the threshold value g of the ring finger for determining the presence/absence of a slide operation of the ring finger on the display object 2. Here, as described above, in the case where the middle finger is fixed, the movement of the ring finger is restricted due to the structure of the hand. Therefore, the threshold value control unit 16 controls the distance of the threshold value g to be small.

As a result, a slide operation is input even if the amount of movement of the ring finger is small, and a slide operation is executed by the ring finger in the direction of the middle finger. Further, the command execution unit 17 selects the button 52. As described above, by controlling the threshold value relating to determination of a slide operation of the ring finger when the middle finger is stationary, it is possible to improve the usability.

Other Embodiments

The present technology is not limited to the embodiments described above, and various other embodiments may be implemented.

In the embodiments described above, the display object 2 has been displayed by the projector 20. The present technology is not limited thereto, and the device displaying the display object 2 may be a touch panel type display or may be an LCD (Liquid Crystal Display), an organic EL (Electro-Luminescence) display, or the like.

In the embodiments described above, a threshold value relating to determination of a gesture has been set to the same value for the respective fingers in advance. The present technology is not limited thereto, and a threshold value may be set for each finger. Further, a threshold value may be arbitrarily controlled for each finger.

In the embodiments described above, the height of a finger has been obtained by machine learning to perform determination of a touch operation. The present technology is not limited thereto, and determination of a touch operation may be performed by an estimator to which an image including a finger is input, the estimator outputting whether or not the finger is touching. Further, a contact sensor or the like may be disposed on a projection surface on which the display object 2 is to be projected.

Further, the method of determining a touch operation is also not limited. For example, a contact sensor that detects whether or not the top surface 26 of the table 25 has been touched may be used.

In the embodiments described above, in the case where the little finger is touching the display object 2, whether or not the height of the ring finger is lower than the threshold value has been determined. The present technology is not limited thereto. For example, Step 104 may be omitted without using Step 103 and Step 104 shown in FIG. 6 together. Similarly, Step 204, Step 305, and Step 405 shown in FIG. 7 may be omitted.

In the embodiments described above, the threshold value relating to determination of a slide operation of the ring finger has been controlled. The present technology is not limited thereto, and the relative distance between the middle finger and the ring finger may be newly set as a threshold value relating to determination of a slide operation of the ring finger. For example, in the case where the ring finger approaches the middle finger within a range of 2 mm or less from the middle finger, it may be determined that a slide operation has been executed.

In the embodiments described above, a form of an upper projection type has been used for the operation input system 100. The present technology is not limited thereto, and the projector 20 may irradiate a display object from below the table 25, thereby displaying the display object 2 on the top surface 26 of the table 25. In this case, the top surface 26 of the table 25 may be formed of a translucent material such as a glass plate and a plastic plate. Such a method in which the projector 20 irradiates a display object from below the table 25, thereby displaying the display object 2 on the top surface 26 of the table 25, is referred to also as a rear-projection type.

FIG. 14 is a block diagram showing a hardware configuration example of the information processing apparatus 10.

The information processing apparatus 10 includes a CPU 61, a ROM (Read Only Memory) 62, a RAM 63, an input/output interface 65, and a bus 64 connecting them to each other. A display unit 66, an input unit 67, a storage unit 68, a communication unit 69, a drive unit 70, and the like are connected to the input/output interface 65.

The display unit 66 is, for example, a display device using liquid crystal, EL, or the like. The input unit 67 is, for example, a keyboard, a pointing device, a touch panel, or another operating device. In the case where the input unit 67 includes a touch panel, the touch panel can be integrated with the display unit 66.

The storage unit 68 is a non-volatile storage device, and is, for example, an HDD, a flash memory, or another solid-state memory. The drive unit 70 is, for example, a device capable of driving a removable recoding medium 71 such as an optical recording medium and a magnetic recording tape.

The communication unit 69 is a modem, router, or another communication device for communicating with another device, which can be connected to a LAN, WAN, or the like. The communication unit 69 may be one that performs communication wired or wirelessly. The communication unit 69 is often used separately from the information processing apparatus 10.

In this embodiment, the communication unit 69 makes it possible to communicate with another device via a network.

The information processing by the information processing apparatus 10 having the hardware configuration described above is realized by the cooperation of software stored in the storage unit 68, the ROM 62, or the like and hardware resources of the information processing apparatus 10. Specifically, the information processing method according to the present technology is realized by loading the program configuring software stored in the ROM 62 or the like into the RAM 63 and executing the program.

The program is installed in the information processing apparatus 10 via, for example, the recording medium 61. Alternatively, the program may be installed in the information processing apparatus 10 via a global network or the like. In addition, an arbitrary computer-readable non-transient storage medium may be used.

The information processing apparatus, the information processing method, and the program according to the present technology may be executed and the information processing apparatus according to the present technology may be constructed by causing the computer installed in the communication terminal and another computer communicable via a network or the like to work together.

That is, the information processing apparatus, the information processing method, and the program according to the present technology can be executed not only in a computer system configured by a single computer but also in a computer system in which a plurality of computers operates in conjunction with each other. Note that in the present disclosure, the system means a set of a plurality of components (devices, modules (parts), etc.), and all the components do not necessarily need to be in the same casing. Therefore, a plurality of devices that is housed in separate casings and connected to each other via a network, and one device in which a plurality of modules is housed in one casing are both systems.

The execution of the information processing apparatus, the information processing method, and the program according to the present technology by a computer system includes, for example, both the case where calculation of the height of a finger, determination of a gesture, control of a threshold value, and the like are executed by a single computer and the case where each type of processing is executed by different computers. Further, execution of each type of processing by a predetermined computer includes causing another computer to execute part or all of the processing and acquiring the result thereof.

That is, the information processing apparatus, the information processing method, and the program according to the present technology are applicable also to a configuration of cloud computing in which a plurality of apparatuses shares and collaboratively processes a single function via a network.

Each configuration of the finger-height calculation unit, the gesture determination unit, the finger-height comparison unit, the threshold value control unit, and the like, control flow of a communications system, and the like described with reference to the drawings are merely an embodiment, and can be arbitrarily modified without departing from the essence of the present technology. In other words, for example, other arbitrary configurations or algorithms for implementing the present technology may be adopted.

Note that the effects described in the present disclosure are merely illustrative and not restrictive, and other effects may be obtained. The description of the plurality of effects described above does not necessarily mean that these effects are exhibited simultaneously. It means that at least one of the effects described above can be achieved in accordance with the condition or the like, and it goes without saying that there is a possibility that an effect that is not described in the present disclosure is exhibited.

Of the characteristic portions of each embodiment described above, at least two characteristic portions can be combined with each other. That is, the various characteristic portions described in the respective embodiments may be arbitrarily combined with each other without distinguishing from each other in the respective embodiments.

In the present disclosure, concepts that define the shape, size, positional relationship, state, and the like such as "central", "middle", "uniform", "equal", "the same", "perpendicular", "parallel", "symmetrical", "extend", "axial direction", "columnar shape", "cylindrical shape", "ring shape", and "circular shape", are concepts including "substantially central", "substantially middle", "substantially uniform", "substantially equal", "substantially the same", "substantially perpendicular", "substantially parallel", "substantially symmetrical", "substantially extend", "substantially axial direction", "substantially columnar shape", "substantially cylindrical shape", "substantially ring shape", and "substantially circular shape".

For example, the states within a predetermined range (e.g., ±10%) based on "completely central", "completely middle", "completely uniform", "completely equal", "completely the same", "completely perpendicular", "completely parallel", "completely symmetrical", "completely extend", "completely axial direction", "completely columnar shape", "completely cylindrical shape", "completely ring shape", and "completely circular shape" are also included.

It should be noted that the present technology may also take the following configurations.

(1) An information processing apparatus, including:
    a threshold value control unit that controls, on a basis of three-dimensional position information of each of a first finger and a second finger acquired from a detection result of a sensor, a threshold value relating to determination of a gesture using at least one of the first finger and the second finger.

(2) The information processing apparatus according to (1), in which
    the gesture includes a touch operation on an object by at least one of the first finger or the second finger, and
    the threshold value control unit controls a threshold value relating to a distance from the object for determining presence/absence of the touch operation.

(3) The information processing apparatus according to (2), in which
    the first finger and the second finger are adjacent to each other, and
    the threshold value control unit decreases, where it is determined that there is the touch operation of the first finger on the object, the threshold value relating to a distance from the object for determining presence/absence of the touch operation of the second finger on the object.

(4) The information processing apparatus according to (2) or (3), in which
the threshold value control unit newly sets, where it is determined that there is the touch operation of the first finger on the object, a threshold value relating to a difference between distances of the first finger and the second finger from the object as the threshold value for determining presence/absence of the touch operation of the second finger on the object.
(5) The information processing apparatus according to any one of (2) to (4), in which
the three-dimensional position information includes coordinates indicating a position of a finger, a distance between the finger and the object, and an amount of movement of the finger.
(6) The information processing apparatus according to (5), in which
the gesture includes a slide operation using at least one of the first finger or the second finger, and
the threshold value control unit controls a threshold value relating the amount of movement of at least one of the first finger or the second finger for determining absence/presence of the slide operation.
(7) The information processing apparatus according to (6), in which
the first finger and the second finger are adjacent to each other, and
the threshold value control unit decreases, where it is determined that there is the touch operation of the first finger on the object, the threshold value relating the amount of movement of the second finger for determining absence/presence of the slide operation of the second finger on the object.
(8) The information processing apparatus according to any one of (5) to (7), in which
the first finger and the second finger are adjacent to each other, and
the threshold value control unit decreases, where the first finger that is in contact with the object is stationary, the threshold value relating the amount of movement of the second finger.
(9) The information processing apparatus according to any one of (1) to (8), in which
the first finger is a middle finger or a little finger, and the second finger is a ring finger.
(10) The information processing apparatus according to any one of (1) to (9), in which
the sensor includes at least one of an imaging device or a ranging sensor.
(11) The information processing apparatus according to any one of (2) to (10), further including
a touch determination unit that determines presence/absence of the touch operation of at least one of the first finger or the second finger on the object.
(12) The information processing apparatus according to any one of (2) to (11), in which
the first finger and the second finger are adjacent to each other, and
the threshold value control unit decreases, where it is determined that there is the touch operation of each of the first finger and the second finger on the object, the threshold value relating to a distance from the object for determining presence/absence of the touch operation of the second finger on the object.
(13) The information processing apparatus according to any one of (1) to (12), in which
the threshold value control unit sets the threshold value relating to the determination of a gesture for each finger.
(14) The information processing apparatus according to any one of (1) to (13), in which
the threshold value control unit controls the threshold value on a basis of a shape of a hand including the first finger and the second finger obtained by a detection result of the sensor.
(15) The information processing apparatus according to (14), in which
the threshold value control unit controls the threshold value where the hand is in a predetermined shape.
(16) The information processing apparatus according to (14) or (15), in which
the threshold value control unit controls the threshold value where the hand is open.
(17) The information processing apparatus according to any one of (1) to (16), further including
a hand-shape determination unit that determines the shape of the hand including the first finger and the second finger.
(18) An information processing method executed by a computer system, including the following step of:
controlling, on a basis of three-dimensional position information of each of a first finger and a second finger acquired from a detection result of a sensor, a threshold value relating to determination of a gesture using at least one of the first finger and the second finger.
(19) A program that causes a computer system to execute the following step of:
controlling, on a basis of three-dimensional position information of each of a first finger and a second finger acquired from a detection result of a sensor, a threshold value relating to determination of a gesture using at least one of the first finger and the second finger.

REFERENCE SIGNS LIST 2 display object
3 first finger
4 second finger
5 sensor unit
10 information processing apparatus
13 gesture determination unit
16 threshold value control unit
41 hand-shape determination unit
100 operation input system

The invention claimed is:
1. An information processing apparatus, comprising:
a central processing unit (CPU) configured to:
set a first threshold value for a first finger;
set a second threshold value for a second finger;
acquire a detection result of a sensor;
generate, based on the acquired detection result, three-dimensional position information of each of the first finger and the second finger;
determine a gesture by the first finger based on the set first threshold value and the generated three-dimensional position information of the first finger; and
change, based on the determination of the gesture by the first finger and the generated three-dimensional position information of the second finger, the set second threshold value of the second finger.

2. The information processing apparatus according to claim 1, wherein in a case where the gesture by the first finger includes a touch operation on an object by the first finger, and a gesture by the second finger includes the touch operation on the object by the second finger, the CPU is further configured to:
 determine, based on the changed second threshold value, one of a presence or an absence of the touch operation of the second finger on the object, wherein
  the changed second threshold value is associated with a distance from the object to a specific height.

3. The information processing apparatus according to claim 2, wherein
 the first finger is adjacent to the second finger, and
 the CPU is further configured to:
  determine, based on the set first threshold value and the generated three-dimensional position information of the first finger, a presence of the touch operation of the first finger on the object;
  decrease, based on the determined presence of the touch operation of the first finger on the object and the generated three-dimensional position information of the second finger, the set second threshold value of the second finger; and
  determine, based on the decreased second threshold value, the one of the presence or the absence of the touch operation of the second finger on the object.

4. The information processing apparatus according to claim 2, wherein the CPU is further configured to:
 determine, based on the set first threshold value and the generated three-dimensional position information of the first finger, a presence of the touch operation of the first finger on the object;
 set, based on the determined presence of the touch operation of the first finger on the object, a third threshold value for the second finger, wherein
  the set third threshold value is associated with a difference between a first distance of the first finger from the object and a second distance of the second finger from the object; and
 determine, based on the set third threshold value and the generated three-dimensional position information of the second finger, the one of the presence or the absence of the touch operation of the second finger on the object.

5. The information processing apparatus according to claim 2, wherein the three-dimensional position information of the first finger includes at least one of coordinates indicating a position of the first finger, a distance of the first finger from the object, or an actual amount of movement of the first finger.

6. The information processing apparatus according to claim 5, wherein in a case where the gesture of the first finger includes a slide operation by the first finger on the object and the gesture of the second finger includes the slide operation by the second finger on the object, the CPU is further configured to:
 determine, based on the changed second threshold value, one of an absence or a presence of the slide operation of the second finger, wherein
  the changed second threshold value is associated with an expected amount of movement of the second finger.

7. The information processing apparatus according to claim 6, wherein
 the first finger is adjacent to the second finger, and
 the CPU is further configured to:
  determine, based on the set first threshold value and the generated three-dimensional position information of the first finger, a presence of the touch operation of the first finger on the object;
  decrease, based on the determined presence of the touch operation of the first finger on the object and the generated three-dimensional position information of the second finger, the set second threshold value of the second finger; and
  determine, based on the decreased second threshold value, the one of the absence or the presence of the slide operation of the second finger on the object.

8. The information processing apparatus according to claim 5, wherein
 the first finger is adjacent to the second finger, and
 the CPU is further configured to:
  determine that the first finger is in contact with the object and is in a stationary state on the object; and
  decrease, based on the determination that the first finger is in contact with the object and is in the stationary state on the object, the set second threshold value of the second finger, wherein
   the set second threshold value of the second finger is associated with an expected amount of movement of the second finger.

9. The information processing apparatus according to claim 2, wherein
 the first finger is adjacent to the second finger, and
 the CPU is further configured to:
  determine a presence of the touch operation of each of the first finger and a touch operation of a third finger on the object, wherein the third finger is adjacent to the second finger;
  decrease, based on the determined presence of the touch operation of each of the first finger and the third finger and the generated three-dimensional position information of the second finger, the set second threshold value; and
  determine, based on the decreased second threshold value, the one of the presence or the absence of the touch operation of the second finger on the object.

10. The information processing apparatus according to claim 1, wherein
 the first finger is one of a middle finger or a little finger, and
 the second finger is a ring finger.

11. The information processing apparatus according to claim 1, wherein the sensor includes at least one of an imaging device or a ranging sensor.

12. The information processing apparatus according to claim 1, wherein the CPU is further configured to determine one of a presence or an absence of a touch operation of at least one of the first finger or the second finger on an object.

13. The information processing apparatus according to claim 1, wherein the CPU is further configured to:
 determine a shape of a hand based on the acquired detection result, wherein the hand includes the first finger and the second finger; and
 change, based on the determination of the gesture of the first finger, the determined shape of the hand, and the generated three-dimensional position information of the second finger, the set second threshold value of the second finger.

14. The information processing apparatus according to claim 13, wherein the determined shape of the hand corresponds to a specific shape.

15. The information processing apparatus according to claim 13, wherein the determined shape of the hand corresponds to an open state.

16. The information processing apparatus according to claim 1, wherein
the CPU is further configured to determine, by a hand-shape determination unit, a shape of a hand, and
the hand includes the first finger and the second finger.

17. An information processing method executed by a computer system, the method comprising:
setting a first threshold value for a first finger;
setting a second threshold value for a second finger;
acquiring a detection result of a sensor;
generating, based on the acquired detection result, three-dimensional position information of each of the first finger and the second finger;
determining a gesture by the first finger based on the set first threshold value and the generated three-dimensional position information of the first finger; and
changing, based on the determination of the gesture by the first finger and the generated three-dimensional position information of the second finger, the set second threshold value of the second finger.

18. A non-transitory computer readable medium having stored thereon, computer executable instructions, which when executed by a computer, cause the computer to execute operations, the operations comprising:
setting a first threshold value for a first finger;
setting a second threshold value for a second finger;
acquiring a detection result of a sensor;
generating, based on the acquired detection result, three-dimensional position information of each of the first finger and the second finger;
determining a gesture by the first finger based on the set first threshold value and the generated three-dimensional position information of the first finger; and
changing, based on the determination of the gesture by the first finger and the generated three-dimensional position information of the second finger, the set second threshold value of the second finger.

* * * * *